US010752834B2

(12) United States Patent
Lin et al.

(10) Patent No.: US 10,752,834 B2
(45) Date of Patent: Aug. 25, 2020

(54) COMPOSITE FLUORESCENT GOLD NANOCLUSTERS WITH HIGH QUANTUM YIELD AND METHOD FOR MANUFACTURING THE SAME

(71) Applicant: Chung Yuan Christian University, Taoyuan (TW)

(72) Inventors: Cheng-An Lin, Taoyuan (TW); Cheng-Yi Huang, Taoyuan (TW); Chia-Hui Lin, Taoyuan (TW); Tzu-Yin Hou, Taoyuan (TW)

(73) Assignee: CHUNG YUAN CHRISTIAN UNIVERSITY, Taoyuan (TW)

( * ) Notice: Subject to any disclaimer, the term of this patent is extended or adjusted under 35 U.S.C. 154(b) by 260 days.

(21) Appl. No.: 15/982,021

(22) Filed: May 17, 2018

(65) Prior Publication Data
US 2019/0352562 A1    Nov. 21, 2019

(51) Int. Cl.
| | | |
|---|---|---|
| C09K 11/58 | (2006.01) | |
| C09K 11/02 | (2006.01) | |
| B82Y 30/00 | (2011.01) | |
| B82Y 15/00 | (2011.01) | |

(52) U.S. Cl.
CPC .......... *C09K 11/582* (2013.01); *C09K 11/025* (2013.01); *B82Y 15/00* (2013.01); *B82Y 30/00* (2013.01); *C09K 2211/1007* (2013.01); *Y10S 977/731* (2013.01); *Y10S 977/81* (2013.01); *Y10S 977/83* (2013.01)

(58) Field of Classification Search
CPC . C09K 11/02–025; C09K 11/08; C09K 11/58; C09K 11/582; C09K 2211/1007; A61K 49/0013; A61K 49/0017; A61K 49/223; Y10S 977/731; Y10S 977/81; Y10S 977/83; C07K 7/06; C07K 7/08; B82Y 15/00; B82Y 30/00
See application file for complete search history.

(56) References Cited

U.S. PATENT DOCUMENTS

| | | | | |
|---|---|---|---|---|
| 7,208,322 B2* | 4/2007 | Stolowitz | ............... | B82Y 15/00 435/6.12 |
| 7,914,588 B2* | 3/2011 | Martinez | .................. | C07K 7/06 424/9.34 |
| 8,162,498 B2* | 4/2012 | Ramer | .................. | F21V 14/003 362/231 |

(Continued)

OTHER PUBLICATIONS

"Synthesis and Optical Properties of a Dithiolate/Phosphine Protected Au28 Nanocluster", Maha A. Aljuhani, Megalamane S. Bootharaju, Lutfan Sinatra, Jean-Marie Basset, Omar F. Mohammad, and Osman M. Bakr, KAUST, Saudi Arabia, American Chemical Society, (Year: 2016).*

(Continued)

*Primary Examiner* — Maliheh Malek

(57) ABSTRACT

Disclosed herein are composite fluorescent gold nanoclusters with high quantum yield, as well as methods for manufacturing the same. According to some embodiments, the composite fluorescent gold nanocluster includes a gold nanocluster and a capping layer that encapsulates at least a portion of the outer surface of the gold nanocluster. The capping layer includes a matrix made of a benzene-based compound, and multiple phosphine-based compounds distributed across the matrix.

10 Claims, 15 Drawing Sheets
(3 of 15 Drawing Sheet(s) Filed in Color)

(56) References Cited

U.S. PATENT DOCUMENTS

| | | | | |
|---|---|---|---|---|
| 8,263,668 | B2* | 9/2012 | Chang | B82Y 15/00 516/33 |
| 8,957,401 | B2* | 2/2015 | Pickett | C09K 11/02 257/13 |
| 9,101,672 | B2* | 8/2015 | Yeh | A61K 47/6923 |
| 9,140,415 | B2* | 9/2015 | Van Bommel | B82Y 30/00 |
| 9,187,318 | B2* | 11/2015 | Duan | B23K 26/0613 |
| 9,302,116 | B2* | 4/2016 | Vo-Dinh | A61B 5/4848 |
| 9,349,921 | B2* | 5/2016 | Tchoul | G02B 1/04 |
| 9,362,189 | B2* | 6/2016 | Jun | H01L 33/505 |
| 9,382,470 | B2* | 7/2016 | Kang | C09K 11/703 |
| 9,443,998 | B2* | 9/2016 | Werner | H01L 33/56 |
| 9,506,864 | B2* | 11/2016 | Chen | C09K 11/06 |
| 9,784,419 | B2* | 10/2017 | Ivan | C09K 11/06 |
| 10,066,158 | B2* | 9/2018 | Naasani | H01L 33/505 |
| 10,202,543 | B2* | 2/2019 | Masson | C09K 11/025 |
| 10,217,908 | B2* | 2/2019 | Naasani | H01L 33/06 |
| 10,573,792 | B2* | 2/2020 | Sato | H01L 33/505 |
| 2002/0146742 | A1* | 10/2002 | Wybourne | B05D 1/185 435/7.1 |
| 2003/0109056 | A1* | 6/2003 | Vossmeyer | G01N 21/77 436/169 |
| 2003/0118729 | A1* | 6/2003 | Bishop | B82Y 30/00 427/256 |
| 2004/0002089 | A1* | 1/2004 | Dubertret | B82Y 15/00 435/6.12 |
| 2004/0018633 | A1* | 1/2004 | Foos | B22F 1/0018 436/166 |
| 2004/0150268 | A1* | 8/2004 | Garito | B82Y 5/00 385/50 |
| 2005/0064204 | A1* | 3/2005 | Lalli | B82Y 30/00 428/428 |
| 2005/0191448 | A1* | 9/2005 | Suh | B41M 5/38207 428/32.69 |
| 2005/0219542 | A1* | 10/2005 | Adams | B82Y 15/00 356/445 |
| 2006/0148104 | A1* | 7/2006 | Marini | B82Y 5/00 436/524 |
| 2006/0154380 | A1* | 7/2006 | Egusa | B22F 1/0018 438/1 |
| 2007/0069199 | A1* | 3/2007 | Choulis | B82Y 20/00 257/40 |
| 2007/0186846 | A1* | 8/2007 | Yong | B82Y 30/00 117/41 |
| 2008/0206562 | A1* | 8/2008 | Stucky | B01J 13/02 428/403 |
| 2008/0241262 | A1* | 10/2008 | Lee | A61K 9/0009 424/490 |
| 2008/0261044 | A1* | 10/2008 | Lalli | E21B 17/003 428/402 |
| 2008/0311488 | A1* | 12/2008 | Su | B22F 1/0096 430/7 |
| 2009/0035575 | A1* | 2/2009 | Tsai | B22F 9/24 428/402 |
| 2009/0050856 | A1* | 2/2009 | Kosowsky | B82Y 10/00 252/502 |
| 2009/0062197 | A1* | 3/2009 | Wolf | B82Y 30/00 514/1.1 |
| 2009/0298115 | A1* | 12/2009 | Chang | G01N 33/533 435/29 |
| 2010/0009427 | A1* | 1/2010 | Martinez | C07K 7/06 435/235.1 |
| 2010/0090176 | A1* | 4/2010 | Kosowsky | H05K 1/0257 252/511 |
| 2010/0123155 | A1* | 5/2010 | Pickett | B82Y 15/00 257/98 |
| 2010/0128275 | A1* | 5/2010 | Chau | B82Y 15/00 356/445 |
| 2010/0140673 | A1* | 6/2010 | Daniel | H05K 1/0221 257/288 |
| 2010/0163806 | A1* | 7/2010 | Chang | B82Y 15/00 252/408.1 |
| 2011/0021970 | A1* | 1/2011 | Vo-Dinh | A61B 5/0071 604/20 |
| 2011/0068321 | A1* | 3/2011 | Pickett | C09K 11/025 257/13 |
| 2011/0068322 | A1* | 3/2011 | Pickett | C09K 11/02 257/13 |
| 2011/0097723 | A1* | 4/2011 | Liu | C12Q 1/6816 435/6.1 |
| 2011/0165689 | A1* | 7/2011 | Ying | B82Y 5/00 436/81 |
| 2011/0185854 | A1* | 8/2011 | Martinez | C07K 7/06 75/371 |
| 2011/0294995 | A1* | 12/2011 | Huo | B82Y 30/00 536/23.1 |
| 2011/0300532 | A1* | 12/2011 | Jahnen-Dechent | A61K 49/0423 435/6.1 |
| 2012/0052513 | A1* | 3/2012 | Thalappil | A61K 49/0017 435/7.23 |
| 2012/0100075 | A1* | 4/2012 | Chang | G01N 33/533 424/9.1 |
| 2012/0195833 | A1* | 8/2012 | Lin | A61K 49/223 424/9.1 |
| 2012/0316347 | A1* | 12/2012 | Katz | C08G 61/02 548/101 |
| 2013/0045877 | A1* | 2/2013 | Yap | G01N 33/54346 506/7 |
| 2013/0052270 | A1* | 2/2013 | Yeh | A61K 47/6923 424/498 |
| 2013/0071619 | A1* | 3/2013 | Kajikawa | B82Y 15/00 428/148 |
| 2013/0157055 | A1* | 6/2013 | Jenneskens | B22F 1/0018 428/403 |
| 2013/0273340 | A1* | 10/2013 | Neretina | B05D 1/32 428/212 |
| 2014/0231749 | A1* | 8/2014 | Lee | B22F 1/0018 257/14 |
| 2014/0360981 | A1* | 12/2014 | Lin | A61K 49/223 216/83 |
| 2014/0369024 | A1* | 12/2014 | Xu | C08F 2/44 362/84 |
| 2015/0037585 | A1* | 2/2015 | Compel | G01N 33/54346 428/402 |
| 2015/0075069 | A1* | 3/2015 | Ichihashi | F21V 9/14 47/17 |
| 2015/0300578 | A1* | 10/2015 | Ivan | C09K 11/06 362/84 |
| 2015/0306253 | A1* | 10/2015 | Zheng | A61K 49/0065 424/9.6 |
| 2016/0104825 | A1* | 4/2016 | Sato | H01L 33/505 257/98 |
| 2016/0131582 | A1* | 5/2016 | Chen | C09K 11/06 436/120 |
| 2016/0271694 | A1* | 9/2016 | Weitekamp | B22F 1/0096 |
| 2016/0272865 | A1* | 9/2016 | Chung | C09K 5/14 |
| 2017/0176272 | A1* | 6/2017 | Yin | B82Y 30/00 |
| 2017/0360933 | A1* | 12/2017 | Huang | C12N 15/111 |
| 2017/0362282 | A1* | 12/2017 | Snow | C07K 14/005 |
| 2018/0055083 | A1* | 3/2018 | Chang | C09K 11/025 |
| 2019/0072245 | A1* | 3/2019 | Kobayashi | F21V 7/30 |
| 2019/0352562 | A1* | 11/2019 | Lin | C09K 11/025 |
| 2020/0086264 | A1* | 3/2020 | Chang | B01D 53/007 |

OTHER PUBLICATIONS

Asadollahi et al., "Investigating the Effects of Some Capping Agents upon Gold Nanocrystals Stability, Size and Surface Plasmon Resonance", Journal of Sciences, Islamic Republic of Iran 16(4): 351-355 (2005).

Sharma et al., "Green synthesis of gold nanoparticles using extracts of Artocarpus Lakoocha fruit and its leaves, and Eriobotrya Japonica leaves", Materials Research Express, 2014.

(56) References Cited

OTHER PUBLICATIONS

Green et al., "A simple one phase preparation of organically capped gold nanocrystals", Chem. Commun., 2000, 183-184.

* cited by examiner

COMPOSITE FLUORESCENT GOLD NANOCLUSTERS WITH HIGH QUANTUM YIELD AND METHOD FOR MANUFACTURING THE SAME

BACKGROUND OF THE INVENTION

1. Field of the Invention

The present disclosure relates to composite fluorescent gold nanoclusters; more particularly, to composite fluorescent gold nanoclusters with high quantum yield.

2. Description of Related Art

With the rapid advancement in the nanotechnology, more and more nanomaterials (e.g., fluorescent probes) are now being used for cell tracking, molecular imaging and/or tumor targeting and diagnosis. Conventionally, organic dyes capable of emitting various colors are preferred compounds as fluorescent probes due to their excellent water solubility and high tolerance to salts. Nonetheless, they are easily bleached and their quantum yields are oftentimes too low to be used widely.

Quantum dots (QDs) offer an alternative to organic dyes, in which the color of the emitted light may be easily adjusted by varying the size of QDs. In addition, one may excite QDs to emit various colors by use of only one light source. Most importantly, QDs do not suffer from the drawback of photobleaching. Moreover, the surface of QDs can be modified so that desired functional compounds are grafted thereon. Therefore, QDs are widely used in the biomedical field. However, QDs are made of heavy metals, and as such, they are regarded as not environment-friendly and may be hazardous to living organisms.

Another alternative is to use fluorescent metal nanoclusters made from noble metals, such as gold, silver, copper, platinum, palladium, etc. The noble metal nanoclusters generally consist of several to tens of atoms and typically measure less than 2 nanometers. The noble metal nanoclusters fall somewhat in between bulk metals and independent atoms (as well as nanoparticles) in terms of electronic, optical and chemical properties. Currently, noble metal nanoclusters with full emission spectrum have been developed and used in biological analyses (e.g., biomarkers). The emission spectrum (from ultraviolet to infrared) may be adjusted by varying the preparation parameters. With their biocompatibility, noble metal nanoclusters have attracted many research and development attentions. Various types of methods for the synthesis of noble metal nanoclusters have been reported, for example, chemical reduction, photoreduction, chemical etching, microwave-assisted method, and phase transfer method. Naked noble metal nanoclusters often are inferior in terms of stability, and accordingly, additional surface ligands and stabilizers are needed to prevent aggregation of nanoclusters. However, these surface ligands and stabilizers may have biological toxicity.

In view of the foregoing, there exists a need in the related art for improved noble metal nanoclusters, as well as methods for preparing the same, such improved noble metal nanoclusters may address at least some of the issues exist in the present art.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one aspect, the present disclosure is directed to a composite fluorescent gold nanocluster. According to various embodiments of the present disclosure, the composite fluorescent gold nanocluster comprises a gold nanocluster, and a capping layer encapsulating at least a portion of the outer surface of the gold nanocluster. The capping layer comprises a matrix made of a benzene-based compound, and a plurality of phosphine-based compounds distributed across the matrix.

According to embodiments of the present disclosure, the benzene-based compound may be any of, benzene, alkylbenzene, halobenzene, phenol, benzoic acid, acetophenone, methyl benzoate, anisole, aniline, nitrobenzene, benzonitrile, benzamide, benzenesulfonic acid, naphthalene, or anthracene. For example, the alkylbenzene is toluene, cumene, ethylbenzene, styrene, or xylene; and the halobenzene is fluorobenzene, chlorobenzene, bromobenzene, or iodobenzene. According to certain examples of the present disclosure, the benzene-based compound is toluene.

According to embodiments of the present disclosure, the phosphine-based compound is any of, phosphine, phosphine oxide, phosphonium, diphosphine, triphosphine, alkyl phosphine, cycloalkyl phosphine, aryl phosphine, aryl phosphine oxide, bidentate phosphine, silicone derivative of phosphine, siloxane or polysilane derivative of phosphine, and olefinic phosphine. In some examples, the phosphine-based compound is alkyl phosphine, such as trioctylphosphine (TOP). In other examples, the phosphine-based compound is aryl phosphine oxide such as trioctylphosphine oxide (TOPO).

In some embodiments, the peak emission of the composite fluorescent gold nanocluster is between about 500 nm to about 580 nm.

In another aspect, the present disclosure is directed to a method for producing composite fluorescent gold nanoclusters. According to embodiments of the present disclosure, the method comprises the steps of, (a) mixing gold(III) chloride ($AuCl_3$) and a benzene-based compound in a molar ratio of 1:0.5 to 1:5 to produce a first fluorescent gold nanoclusters; and (b) treating the first fluorescent gold nanoclusters with an energy source selected from the group consisting of UV, acoustic, heat, microwave and a combination thereof to produce a second fluorescent gold nanoclusters; and (c) modifying the second fluorescent gold nanoclusters of the step (b) with a phosphine-based compound to produce the composite fluorescent gold nanoclusters of claim 1; wherein, the method is characterized in not using any reducing agent.

According to various embodiments of the present disclosure, in the step (a), the gold(III) chloride and the benzene-based compound are mixed in a molar ratio of 1:0.3 to 1:2.5.

According to embodiments of the present disclosure, the benzene-based compound may be any of, benzene, alkylbenzene, halobenzene, phenol, benzoic acid, acetophenone, methyl benzoate, anisole, aniline, nitrobenzene, benzonitrile, benzamide, benzenesulfonic acid, naphthalene, or anthracene. For example, the alkylbenzene is toluene, cumene, ethylbenzene, styrene, or xylene; and the halobenzene is fluorobenzene, chlorobenzene, bromobenzene, or iodobenzene. According to certain examples of the present disclosure, the benzene-based compound is toluene.

According to embodiments of the present disclosure, the phosphine-based compound is any of, phosphine, phosphine oxide, phosphonium, diphosphine, triphosphine, alkyl phosphine, cycloalkyl phosphine, aryl phosphine, aryl phosphine oxide, bidentate phosphine, silicone derivative of phosphine, siloxane or polysilane derivative of phosphine, and olefinic phosphine. In some examples, the phosphine-based compound is alkyl phosphine, such as trioctylphosphine (TOP). In other examples, the phosphine-based compound is aryl phosphine oxide such as trioctylphosphine oxide (TOPO).

According to embodiments of the present disclosure, the first and the second fluorescent gold nanoclusters respectively emit blue and yellow light, and the composite fluorescent gold nanoclusters emit yellow or green light with the peak emission wavelength ranges from 500 nm to 580 nm.

According to alternative embodiments of the present disclosure, composite fluorescent gold nanoclusters may be produced by a method that includes steps of, (a) mixing gold(III) chloride ($AuCl_3$), a benzene-based compound, and a phosphine-based compound in a molar ratio of 1:0.5:0.1 to 1:5:20 to produce a third fluorescent gold nanoclusters; and (b) treating the third fluorescent gold nanoclusters with an energy source selected from the group consisting of UV, acoustic, heat, microwave and a combination thereof to produce the composite fluorescent gold nanoclusters; wherein, the method is characterized in not using any reducing agent.

According to embodiments of the present disclosure, the benzene-based compound may be any of, benzene, alkylbenzene, halobenzene, phenol, benzoic acid, acetophenone, methyl benzoate, anisole, aniline, nitrobenzene, benzonitrile, benzamide, benzenesulfonic acid, naphthalene, or anthracene. For example, the alkylbenzene is toluene, cumene, ethylbenzene, styrene, or xylene; and the halobenzene is fluorobenzene, chlorobenzene, bromobenzene, or iodobenzene. According to certain examples of the present disclosure, the benzene-based compound is toluene.

According to embodiments of the present disclosure, the phosphine-based compound is any of, phosphine, phosphine oxide, phosphonium, diphosphine, triphosphine, alkyl phosphine, cycloalkyl phosphine, aryl phosphine, aryl phosphine oxide, bidentate phosphine, silicone derivative of phosphine, siloxane or polysilane derivative of phosphine, and olefinic phosphine. In some examples, the phosphine-based compound is alkyl phosphine, such as trioctylphosphine (TOP). In other examples, the phosphine-based compound is aryl phosphine oxide such as trioctylphosphine oxide (TOPO).

According to embodiments of the present disclosure, the composite fluorescent gold nanoclusters emit yellow or green light with the peak emission wavelength ranges from 500 nm to 580 nm.

Many of the attendant features and advantages of the present disclosure will becomes better understood with reference to the following detailed description considered in connection with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present description will be better understood from the following detailed description read in light of the accompanying drawings, where.

Figure 1:
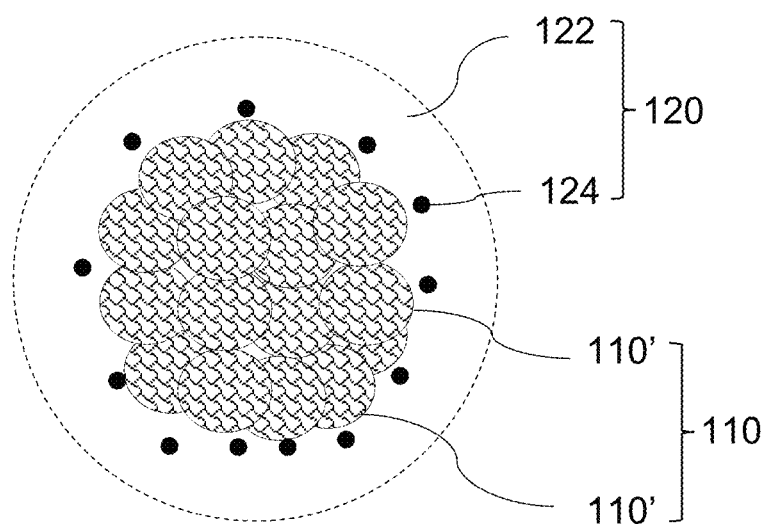
FIG. 1 is a schematic diagram illustrating the fluorescent gold nanocluster of one embodiment of the present disclosure.

In accordance with common practice, the various described features/elements are not drawn to scale but instead are drawn to best illustrate specific features/elements relevant to the present invention.

DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

For convenience, certain terms employed in the specification, examples and appended claims are collected here. Unless otherwise defined herein, scientific and technical terminologies employed in the present disclosure shall have the meanings that are commonly understood and used by one of ordinary skill in the art.

Unless otherwise required by context, it will be understood that singular terms shall include plural forms of the same and plural terms shall include the singular. Also, as used herein and in the claims, the terms "at least one" and "one or more" have the same meaning and include one, two, three, or more. Furthermore, the phrases "at least one of A, B, and C", "at least one of A, B, or C" and "at least one of A, B and/or C," as use throughout this specification and the appended claims, are intended to cover A alone, B alone, C alone, A and B together, B and C together, A and C together, as well as A, B, and C together.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about."

As used herein, the term "nanocluster" refers to an association of several to dozens of atoms of a metal (such as gold). Nanoclusters may have diameters in the range of about 0.1 to about 3 nm.

The term "fluorescence" or "fluorescent," as used herein, refers to a physical phenomenon based upon the ability of certain compounds to absorb and emit light at different wavelengths. The absorption of light (photons) at a first wavelength is followed by the emission of photons at a second wavelength and different energy. As used herein, the term "red-shift" refers to the shifting of the point of maximum amplitude of one or more peaks in a fluorescence emission profile to a longer wavelength. Despite the name "red", a red-shift may occur in any part of the electromagnetic spectrum. Here, the term "quantum yield" refers to the efficiency with which the fluorescent gold nanocluster converts the absorbed photons into fluorescence.

The present invention is base, at least in part, on the discovery that fluorescent characteristics of a nanocluster (e.g., tunability and quantum yield) are improved if the surface of the nanocluster core is modified with functional groups like phenyl and phosphine.

Reference is made to FIG. 1, which is a schematic diagram illustrating a composite fluorescent gold nanocluster 100 according to one embodiment of the present disclosure. As illustrated, the composite fluorescent gold nanocluster 100 comprises a gold nanocluster 110 and a capping layer 120.

Specifically, the gold nanocluster 110 is an aggregate of gold atoms 110'. As could be appreciated, although a specific number of gold atoms 110' is depicted in FIG. 1, embodiments of the present invention are not limited thereto; rather, the gold nanocluster 110 may comprise any suitable number in the range of several to dozens of gold atoms 110'. Preferably, the gold nanoclusters as described herein comprise 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 atoms. In other preferred embodiments, the gold nanoclusters comprise 2-30 atoms, 5-25 atoms, 5-20 atoms, or 5-15 atoms. Generally, the diameter of the gold nanocluster 110 is about 0.1 to about 3 nm; preferably less than about 2 nm.

The capping layer 120 comprises a matrix 122 made of a benzene-based compound; and a plurality of phosphine-based compounds 124 distributed across the matrix 122. As illustrated in FIG. 1, the capping layer 120 encapsulates the entire gold nanocluster 110, whereas in other alternative embodiments, the capping layer 120 encapsulates or covers just a portion of the outer surface of the gold nanocluster 110, or several portions of the outer surface of the gold nanocluster 110. As is evident from the experimental data of the working example provided herein, the presence of both the benzene and the phosphine functional group in the capping layer confers satisfactory fluorescent characteristics to the present composite fluorescent gold nanoclusters 100.

According to various embodiments of the present disclosure, the matrix 122 is made of a benzene-based compound. Examples of the benzene-based compound include, but are not limited to, benzene, alkylbenzene (such as, toluene, cumene, ethylbenzene, styrene, and xylene), halobenzene (e.g., fluorobenzene, chlorobenzene, bromobenzene, and iodobenzene), oxygen-containing benzene (e.g., phenol, benzoic acid, acetophenone, methyl benzoate, and anisole), nitrogen-containing benzene (e.g., aniline, nitrobenzene, benzonitrile, and benzamide), sulfur-containing benzene (e.g., benzenesulfonic acid), or polyaromatic (e.g., naphthalene, and anthracene). According to some working examples of the present disclosure, the benzene-based compound is toluene.

As to the phosphine-based compound 124, it refers to a molecule that has at least one phosphine group (e.g., in the form of phosphine, phosphine oxide, or phosphonium). Phosphine-based compound is known to persons having ordinary skill in the art, suitable examples of phosphine-based compound include, but are not limited to, phosphine, phosphine oxide, phosphonium, diphosphine, triphosphine, alkyl phosphine, cycloalkyl phosphine, aryl phosphine, aryl phosphine oxide, bidentate phosphine, silicone derivative of phosphine, siloxane or polysilane derivative of phosphine, and olefinic phosphine. In some examples, the phosphine-based compound is alkyl phosphine, such as trioctylphosphine (TOP). In other examples, the phosphine-based compound is aryl phosphine oxide such as trioctylphosphine oxide (TOPO).

According to certain embodiments of the present disclosure, the peak emission of the composite fluorescent gold nanocluster 100 is between about 500 nm to about 580 nm, such as 500, 505, 510, 515, 520, 525, 530, 535, 540, 545, 550, 555, 560, 565, 570, 575, and 580 nm. In some examples, the composite fluorescent gold nanocluster 100 has a peak emission wavelength at about 570 nm, in other examples, at about 575 nm.

According to various embodiments of the present disclosure, the present composite fluorescent gold nanocluster 100 may be produced by any methods set forth in the working examples. The present methods are advantageous at least in the aspects listed bellowed: (1) the present method does not require the use of any reducing agent, thereby confers the thus produced gold nanoclusters free from any toxicity that might result from reducing agents employed in conventional methods; (2) the present fluorescent gold nanocluster are biocompatible; (3) the fluorescent characteristics (such as peak emission and fluorescence intensity) of the present composite fluorescent gold nanoclusters are tunable by applying one or more of the energy treatment, which includes, but is not limited to, light, acoustic energy, heat, and microwave.

According to some embodiments of the present disclosure, the composite fluorescent gold nanocluster is prepared by a method comprising:

(a) mixing gold(III) chloride ($AuCl_3$) and a benzene-based compound at a molar ratio of about 1:0.5 to 1:5 to produce a first fluorescent gold nanoclusters;

(b) treating the first fluorescent gold nanoclusters with an energy source selected from the group consisting of UV, acoustic, heat, microwave and a combination thereof to produce a second fluorescent gold nanoclusters; and (c) modifying the second fluorescent gold nanoclusters of the step (b) with a phosphine-based compound to produce the composite fluorescent gold nanoclusters; wherein, the method is characterized in not using any reducing agent.

Examples of the benzene-based compound suitable for use in the present method include, but are not limited to, benzene, alkylbenzene (such as, toluene, cumene, ethylbenzene, styrene, and xylene), halobenzene (e.g., fluorobenzene, chlorobenzene, bromobenzene, and iodobenzene), oxygen-containing benzene (e.g., phenol, benzoic acid, acetophenone, methyl benzoate, and anisole), nitrogen-containing benzene (e.g., aniline, nitrobenzene, benzonitrile, and benzamide), sulfur-containing benzene (e.g., benzenesulfonic acid), or polyaromatic (e.g., naphthalene, and anthracene). According to some working examples of the present disclosure, the benzene-based compound is toluene.

According to some embodiments, the gold(III) chloride is mixed with the benzene-based compound in a ratio of about 0.5 to about 10 micrograms per microliter of the benzene-based compound to produce a first fluorescent gold nanoclusters. Preferably, the ratio is about 1 to 7.5 micrograms gold(III) chloride per microliter of the benzene-based compound. For example, the gold(III) chloride may be used in an amount of about 0.5, 1, 1.5, 2, 2.5, 3, 3.5, 4, 4.5, 5, 5.5, 6, 6.5, 7, 7.5, 8, 8.5, 9, 9.5, or 10 micrograms per microliter of the benzene-based compound. Put it in another way, the gold(III) chloride and the benzene-based compound are mixed in a molar ratio of about 1:0.5 to 1:5. Specifically, for one part by mole of gold(III) chloride, there are 0.5, 0.6, 0.7, 0.8, 0.9, 1, 1.5, 2, 2.5, 3, 3.5, 4, 4.5, or 5 parts by mole of the benzene-based compound.

The thus produced first fluorescent gold nanoclusters emit blue light upon excitation; they are further exposed to at least one energy source for certain period of time to tune up the peak wavelength and/or emission intensity (i.e., step (b)). Examples of the energy source include, but are not limited to, UV light, acoustic energy, heat, microwave and etc. According to embodiments of the present disclosure, the first fluorescent gold nanoclusters are exposed to UV light for 1 to 5 hrs (e.g., 2 hrs) to produce a second fluorescent gold nanoclusters, which emit yellow light upon excitation. Alternatively or optionally, the first fluorescent gold nanoclusters are exposed to heat (such as 80 or 120° C.) for 1 to 5 hrs, preferably about 2 hrs, to produce the second fluorescent gold nanoclusters. Still optionally, the first fluorescent gold nanoclusters are exposed to heat (such as 80° C.) for 1 to 5 hrs, and then to UV for 1-5 hrs, to produce the second fluorescent gold nanoclusters.

The second fluorescent gold nanoclusters are then mixed with a phosphine-based compound to produce the desired composite fluorescent gold nanoclusters, which emit green or yellow light (i.e., step (c)). Suitable examples of the phosphine-based compound include, but are not limited to, phosphine, phosphine oxide, phosphonium, diphosphine, triphosphine, alkyl phosphine, cycloalkyl phosphine, aryl phosphine, aryl phosphine oxide, bidentate phosphine, silicone derivative of phosphine, siloxane or polysilane derivative of phosphine, and olefinic phosphine. In some examples, the phosphine-based compound is alkyl phosphine, such as trioctylphosphine (TOP). In other examples, the phosphine-based compound is aryl phosphine oxide such as trioctylphosphine oxide (TOPO).

According to embodiments of the present disclosure, the method described herein is characterized in not using any reducing agent, such as sodium citrate and the like.

According to other embodiments of the present disclosure, the composite fluorescent gold nanocluster is prepared by a method comprising: (a) mixing gold(III) chloride ($AuCl_3$), a benzene-based compound, and a phosphine-based compound in a molar ratio of 1:0.5:0.1 to 1:5:20 to produce a third fluorescent gold nanoclusters; and (b) treating the third fluorescent gold nanoclusters with an energy source selected from the group consisting of UV, acoustic, heat, microwave and a combination thereof to produce the composite fluorescent gold nanoclusters. This method is characterized in not using any reducing agent (e.g., sodium citrate).

The method in these embodiments differs from the method described above in that the phosphine-based compound is added in the step (a), instead of after energy treatment. However, whether the phosphine-based compound is included in the beginning (e.g., in the step (a)) or later (e.g., after UV and/or heat treatment), the thus produced composite fluorescent gold nanoclusters all emit green or yellow light, accordingly, the timing for the addition of the phosphine-based compound is not critical to the present method. As is evident from the experimental data provided below, the multiple addition of the phosphine-based compound both before and after the heat and/or UV treatment further increases the fluorescence intensity of the composite fluorescent gold nanoclusters.

As could be appreciated by persons having ordinary skill in the art, the benzene-based compound and phosphine-based compound suitable for use in the present method can be any compound described above in connection with the present composite fluorescent gold nanoclusters.

The following Examples are provided to elucidate certain aspects of the present invention and to aid those of skilled in the art in practicing this invention. These Examples are in no way to be considered to limit the scope of the invention in any manner. Without further elaboration, it is believed that one skilled in the art can, based on the description herein, utilize the present invention to its fullest extent.

Example 1

Preparation of Blue and Yellow Fluorescent Gold Nanoclusters Capped with a Matrix Made of a Benzene-Based Compound In the present example, a hydrophobic, inorganic gold-containing compound was used as the starting material, and a benzene-based compound was used as the solvent to prepare fluorescent gold nanoclusters without using any reductants.

1.1 Preparation of Blue Fluorescent Gold Nanoclusters Capped with Toluene

In an oxygen-free and moisture-free glove box, 1 mg gold (III) chloride ($AuCl_3$) was added into 1 ml of toluene (approximately in a molar ratio of 1:2.85). The mixture was shake for about 1 minute to facilitate the mixing, then was centrifuged at 3,000 rpm for 5 minutes, and the supernatant was collected. The supernatant contained blue fluorescent gold nanoclusters (or nanoclusters) capped with toluene (hereinafter, blue fluorescent gold nanoclusters 1).

Figure 2A:
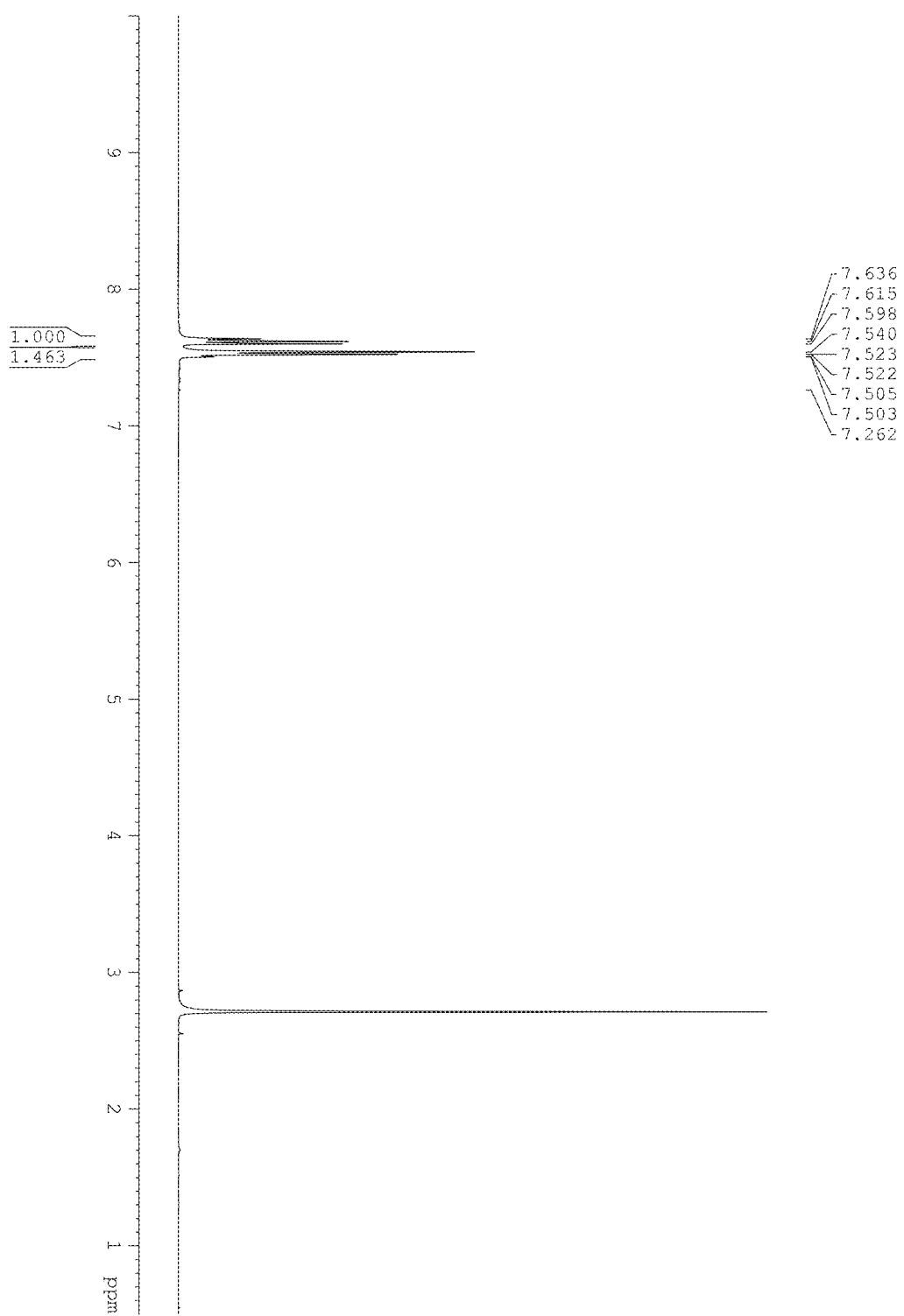
FIG. 2A and FIG. 2B are $^1$H-NMR spectra of fluorescent gold nanoclusters according to one working example of the present disclosure.
Figure 2B:
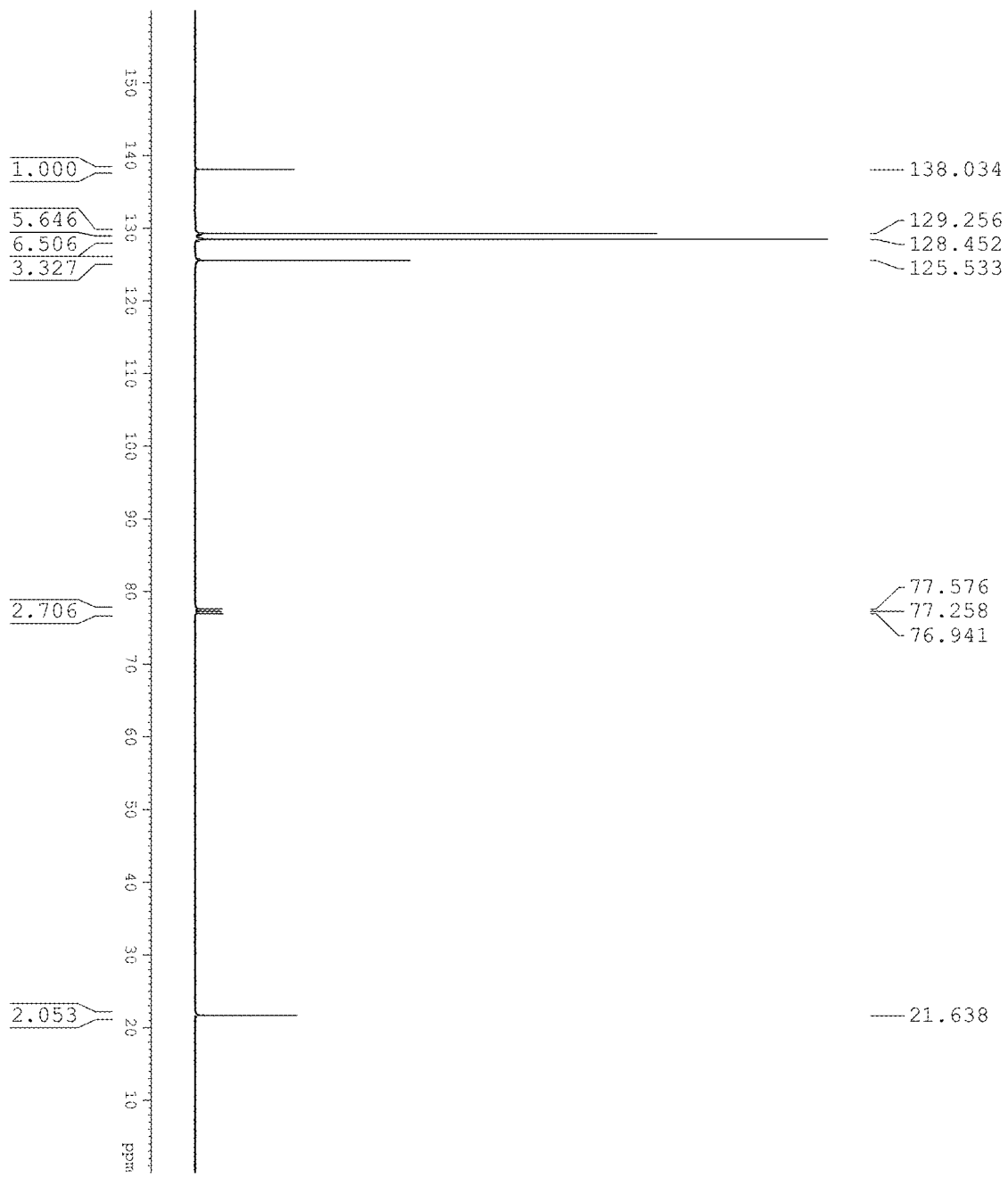

The product was subjected to Nuclear Magnetic Resonance (NMR) Spectroscopy analysis using Bruker NMR 400 MHz spectrometer to determine if the aromatic component was present on the surface of the resulted gold nanoclusters. FIG. 2A and FIG. 2B are the 1H-NMR spectra of a standard toluene solution and the present blue fluorescent gold nanoclusters 1, respectively. As depicted in FIG. 2A, significant signals appeared around 7 to 8 ppm, which were the signature signal of the benzene ring due to the diamagnetic ring current. The benzene ring signals at approximately 7 to 8 ppm were also observed in FIG. 2B. It is believed that the fluorescent characteristics and tunability of the gold nanoclusters of this example was resulted from the presence of benzene ring structure on the surface of the gold nanoclusters.

1.2 Preparation of Yellow Fluorescent Gold Nanoclusters Capped with Toluene

Figure 3A:
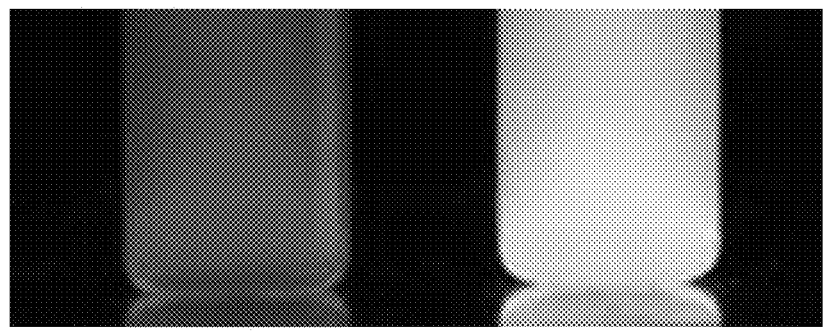
FIG. 3A is a representative photograph of fluorescent gold nanoclusters according to one working example of the present disclosure.
Figure 3B:
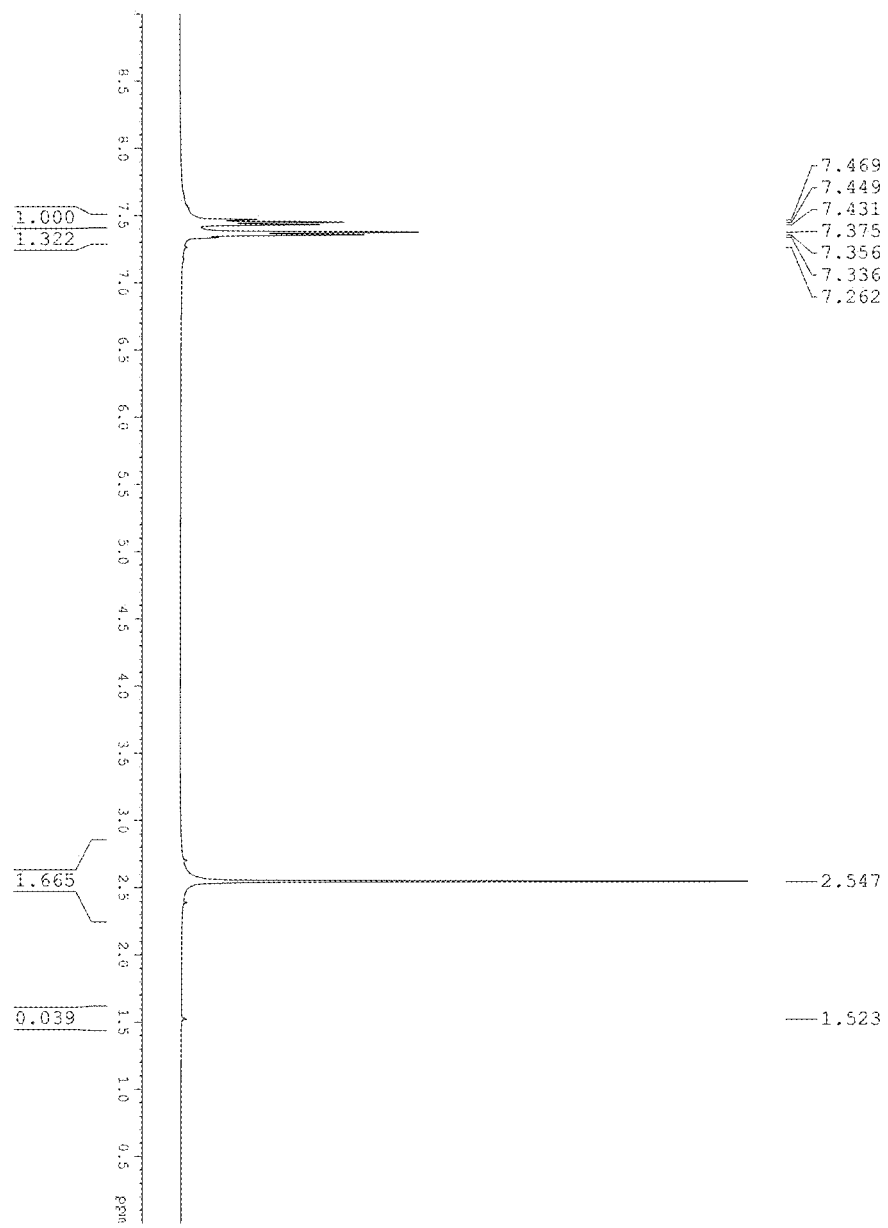
FIG. 3B is the $^1$H-NMR spectrum of fluorescent gold nanoclusters of FIG. 3A.

The blue fluorescent gold nanoclusters 1 of Example 1.1 was placed in a quartz cell and irradiated using a hand-held ultraviolet (UV) lamp, which had a peak emission of 365 nm, for 2 hours. FIG. 3A are photographs of the gold nanocluster composition before (left panel) and after (right panel) the UV irradiation; as could be seen in the photographs, after UV irradiation, the fluorescence emitted from the gold nanoclusters changed from the blue fluorescence into the yellow fluorescence. FIG. 3B is the 1H-NMR spectrum of the thus-produced yellow fluorescent gold nanoclusters capped with toluene (hereinafter, yellow fluorescent gold nanoclusters), which also exhibited the signature benzene ring signal at about 7 to 8 ppm.

Based on the results in both Examples 1.1 and 1.2, it is confirmed that UV radiation may cause red-shift on the color of the fluorescent gold nanoclusters, and each of the thus-prepared gold nanoclusters has the benzene ring component on its surface.

Example 2

Modulating Fluorescent Characteristics of Fluorescent Gold Nanoclusters of Example 1 by Heat and/or UV In this example, fluorescent characteristics of the fluorescent gold nanoclusters of Example 1 were investigated by use of heat and/or UV irradiation.

Briefly, blue fluorescent gold nanoclusters were prepared in accordance with procedures similar to that of Example 1.1 except the gold (III) chloride ($AuCl_3$) and toluene were mixed at a molar ratio of about 1:0.33 (7.5 mg $AuCl_3$ per microliter of toluene); and were further subjected to heat and/or UV treatment. In the case of the UV treatment, the reaction mixture was centrifuged beforehand, and the supernatant was collected for subsequent treatment and analysis.

2.1 UV Treatment

Figure 4A:
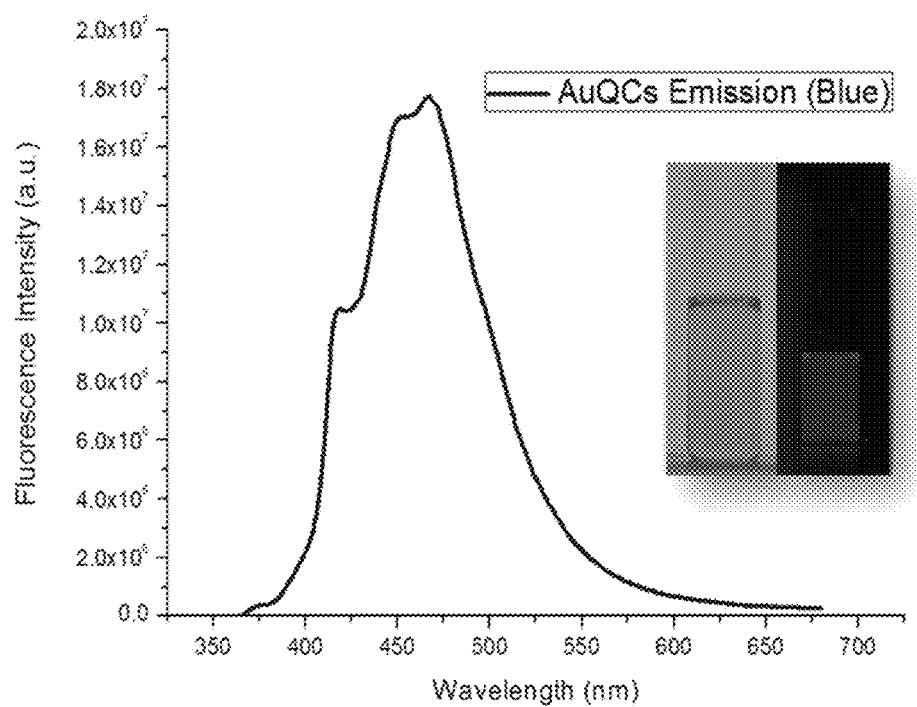
FIG. 4A provides representative photograph and fluorescence spectra of fluorescent gold nanoclusters according to one working example of the present disclosure.

Reference is made to FIG. 4A, the photographs demonstrate that the thus-prepared blue fluorescent gold nanoclusters were colorless under a common light source (left panel) and emitted blue fluorescence with peak emission appeared at 470 nm, when using the UV light as the light source (right panel).

Figure 4B:
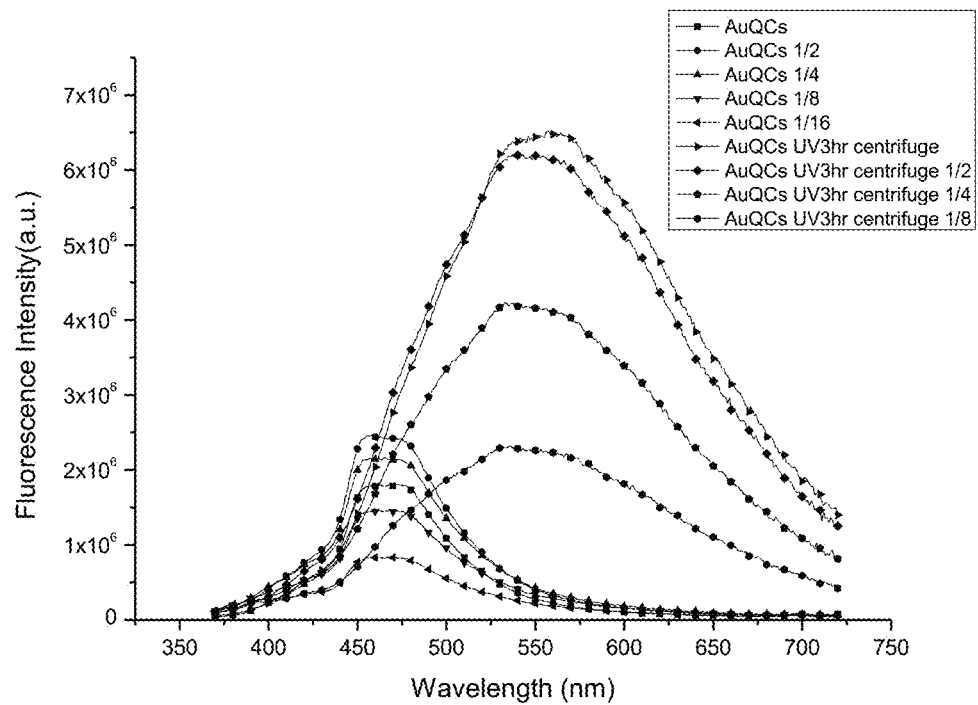
FIG. 4B and FIG. 4C provide representative fluorescence spectra of fluorescent gold nanoclusters according to one working example of the present disclosure.

The blue fluorescent gold nanoclusters were then diluted with toluene to produce diluted blue fluorescence gold nanoclusters at ½, ¼, ⅛, or 1/16 folds dilution, which were subjected to a 3-hour UV exposure (irradiation wavelength: 365 nm; irradiation power: 100 W), and the emission spectra were measured at an excitation wavelength of 350 nm. Similar to the finding in FIG. 3B, the blue fluorescent gold nanoclusters were transformed into yellow fluorescent gold nanoclusters capped with toluene upon the UV treatment. Moreover, the trends (such as, the red-shifting from approximately 450 nm to 550 nm, as well as the increased quantum yield) were the same to all dilutions of the gold nanoclusters that were tested (FIG. 4B).

Figure 4C:
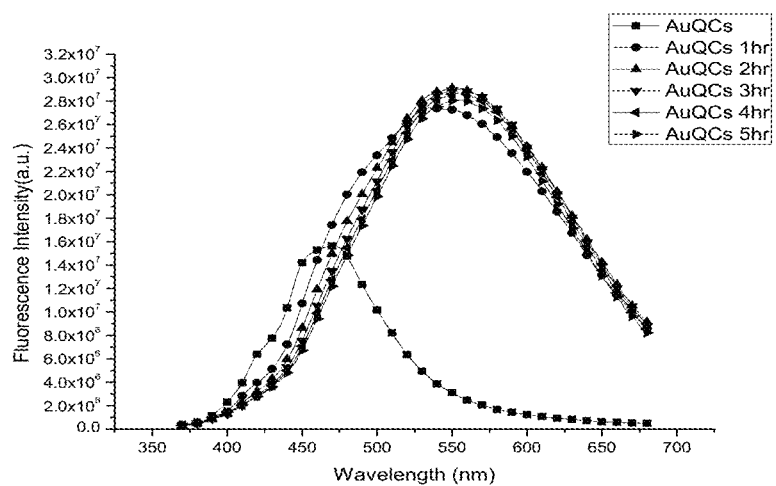

The blue fluorescent gold nanoclusters were also subjected to the UV exposure for up to 5 hours, and as illustrated in FIG. 4C, after 2-hours' UV irradiation, the peak emission of the yellow fluorescent gold nanoclusters at 550 nm (excitation wavelength: 350 nm) was observed, and the peak stayed relatively the same even with continued exposure of UV for a total of 5 hours. This same emission peak (about 550 nm) was also observed in fluorescent gold nanoclusters that were treated with UV for 24 hours (data not shown).

Figure 4D:
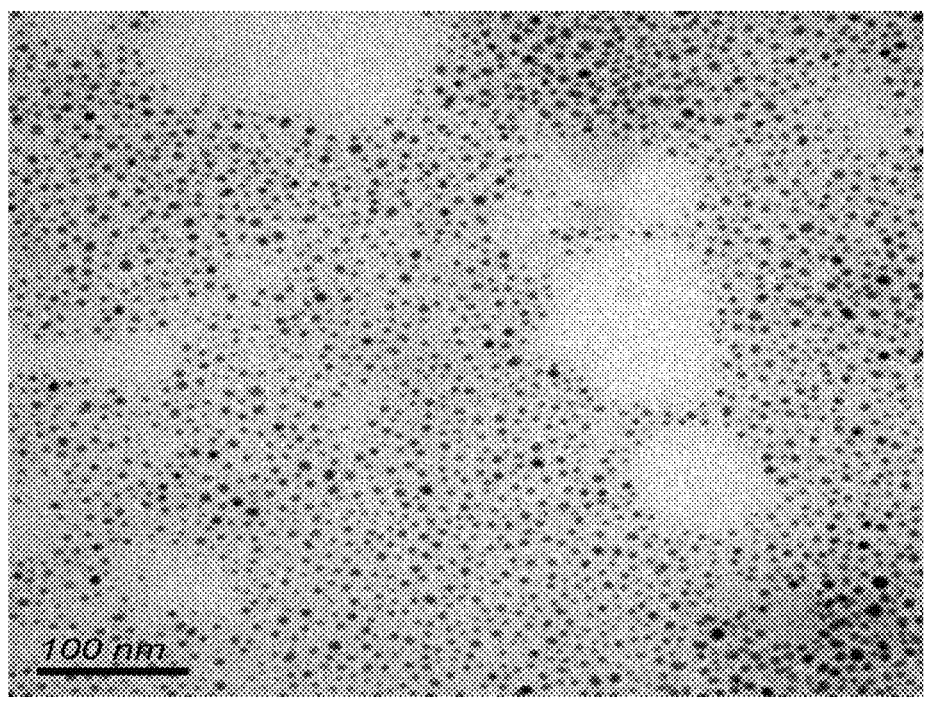
FIG. 4D is a field emission gun transmission electron microscopic image of fluorescent gold nanoclusters according to one working example of the present disclosure.

FIG. 4D is a field emission gun transmission electron microscopic (FEG-TEM) photograph of the yellow fluorescent gold nanoclusters after being exposed to UV light for 24 hours, which indicates that the average diameter of the nanocluster was about 2.6 nm.

The results in this example demonstrated that the fluorescence band of fluorescent gold nanoclusters was tunable by the UV treatment, and the fluorescence intensity (i.e., the quantum yield) thereof was also enhanced by the UV treatment. After the UV exposure, the gold nanoclusters, when being excited using a fluorescent spectrometer of 350 nm, had a peak emission at about 550 nm, which gave a yellow fluorescence.

2.2 Heat Treatment

Figure 5A:
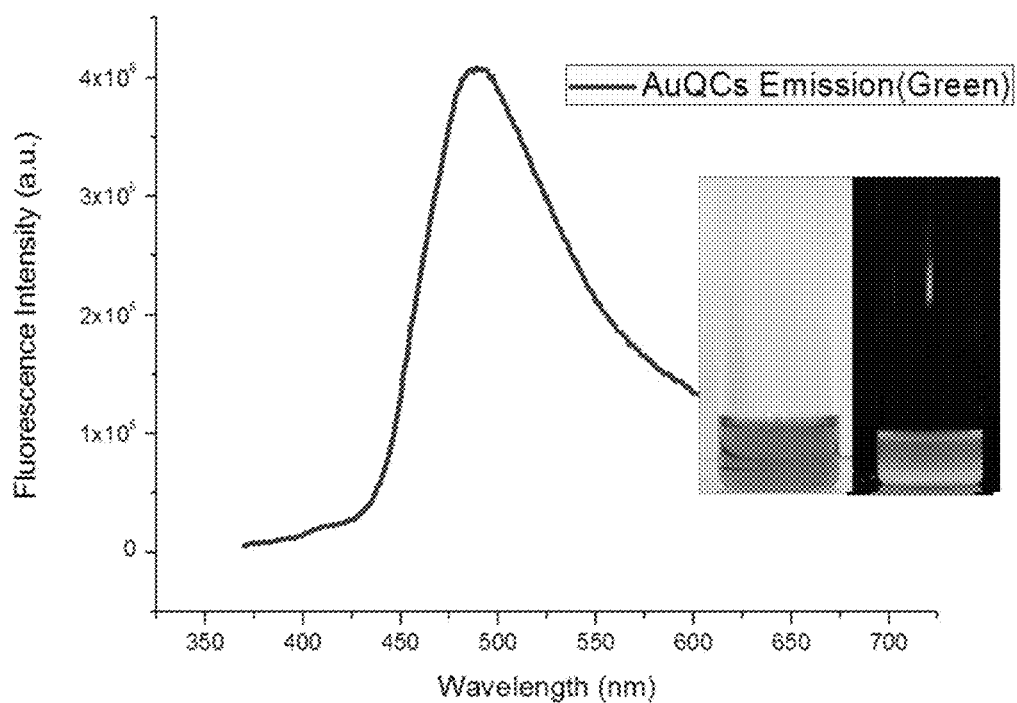
FIG. 5A and FIG. 5B are representative photographs and fluorescence spectra of fluorescent gold nanoclusters according to one working example of the present disclosure.
Figure 5B:
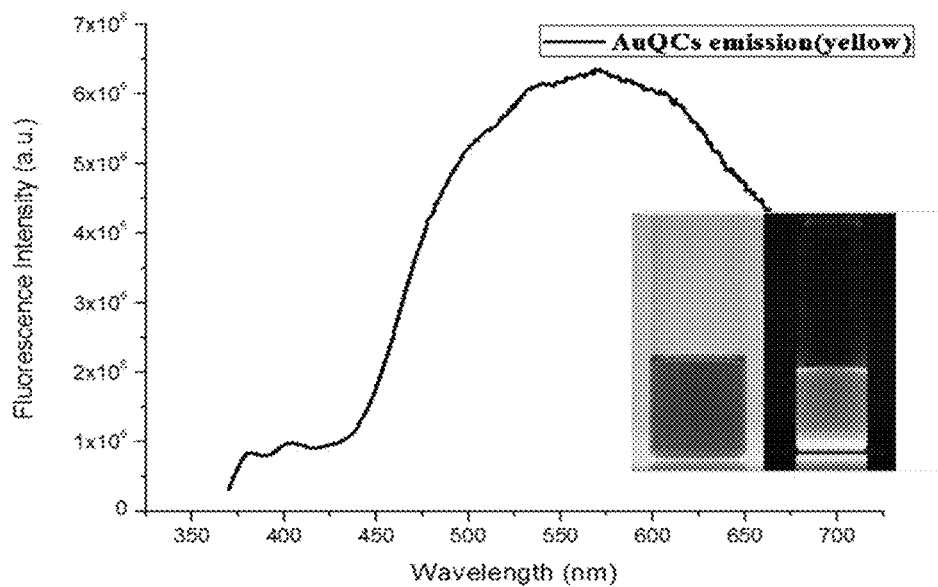

In this example, blue fluorescent gold nanoclusters of example 2.1 were subjected to a heat treatment, either at 80° C. or 120° C. for 1 hour. Results are depicted in FIGS. 5A and 5B. It was found that, heat was as effective as UV radiation in causing red-shift in the emission wavelength of the blue fluorescent gold nanoclusters, in which the peak emission shifted from 450 nm to about 495 nm (green fluorescence, FIG. 5A) and 570 nm (yellow fluorescence, FIG. 5B) after heating at 80° C. and 120° C. for 1 hour, respectively.

Figure 5C:
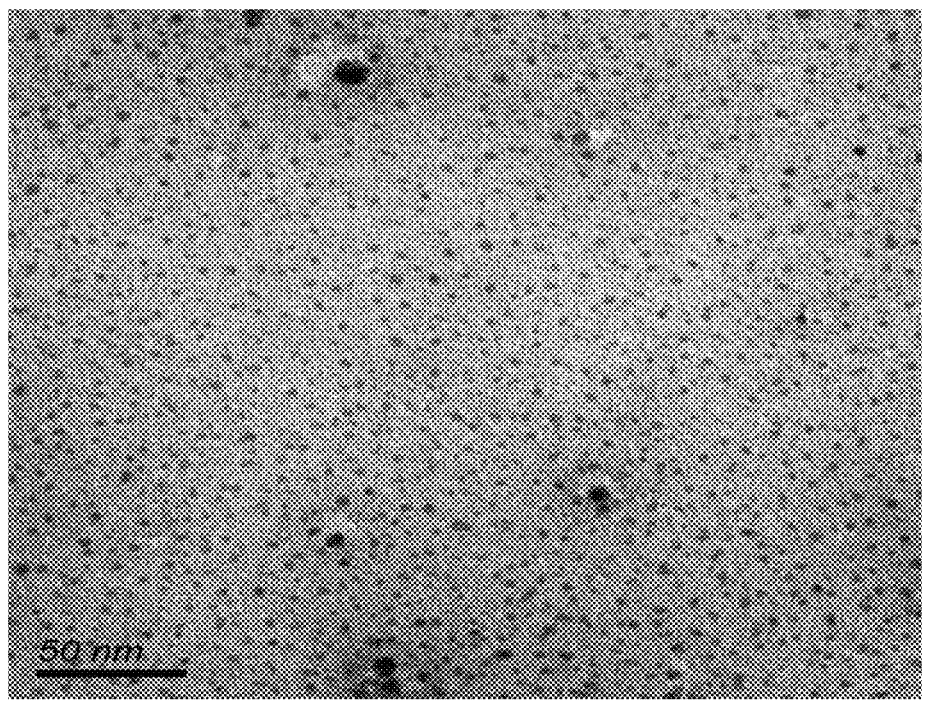
FIG. 5C and FIG. 5D are field emission gun transmission electron microscopic images of fluorescent gold nanoclusters according to one working example of the present disclosure.
Figure 5D:
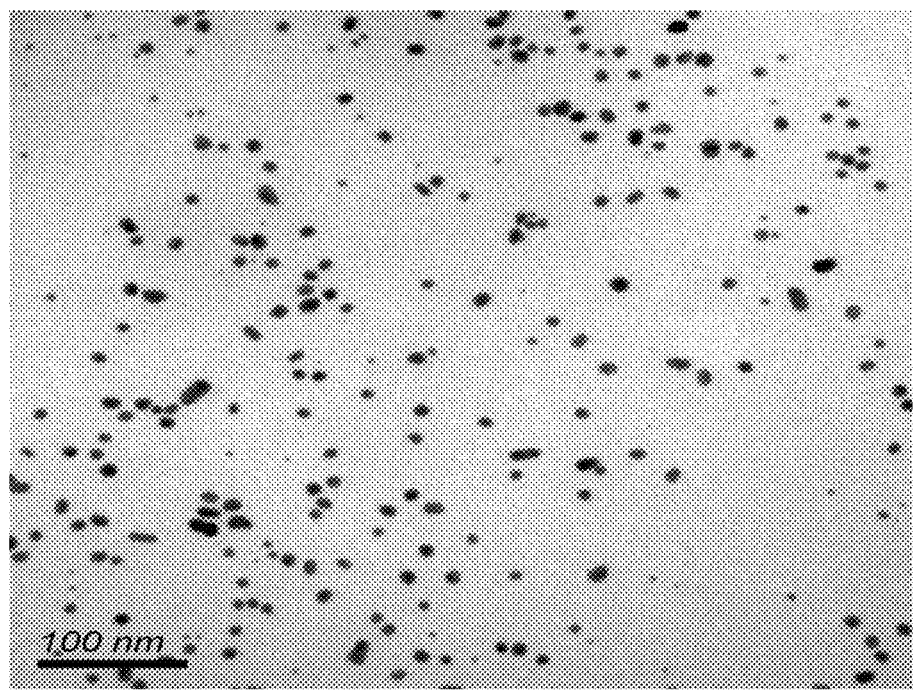

FIGS. 5C and 5D are TEM photographs of the green and yellow fluorescent gold nanoclusters of FIGS. 5A and 5B, respectively. Although the average diameters of these fluorescent gold nanoclusters were approximately 2.6 nm, it was found that the heat treatment tended to produce more gold nanoclusters that were relatively bigger in size, presumably due to heat-induced aggregation of the clusters.

2.3 Combination of Heat and UV Treatments

In this example, the green fluorescent gold nanoclusters and yellow fluorescent gold nanoclusters of Example 2.2 were independently subjected to a 2-hold serial dilution, and then treated with UV irradiation for up to 5 hours (irradiation wavelength: 365 nm; irradiation power: 100 W).

Figure 6A:
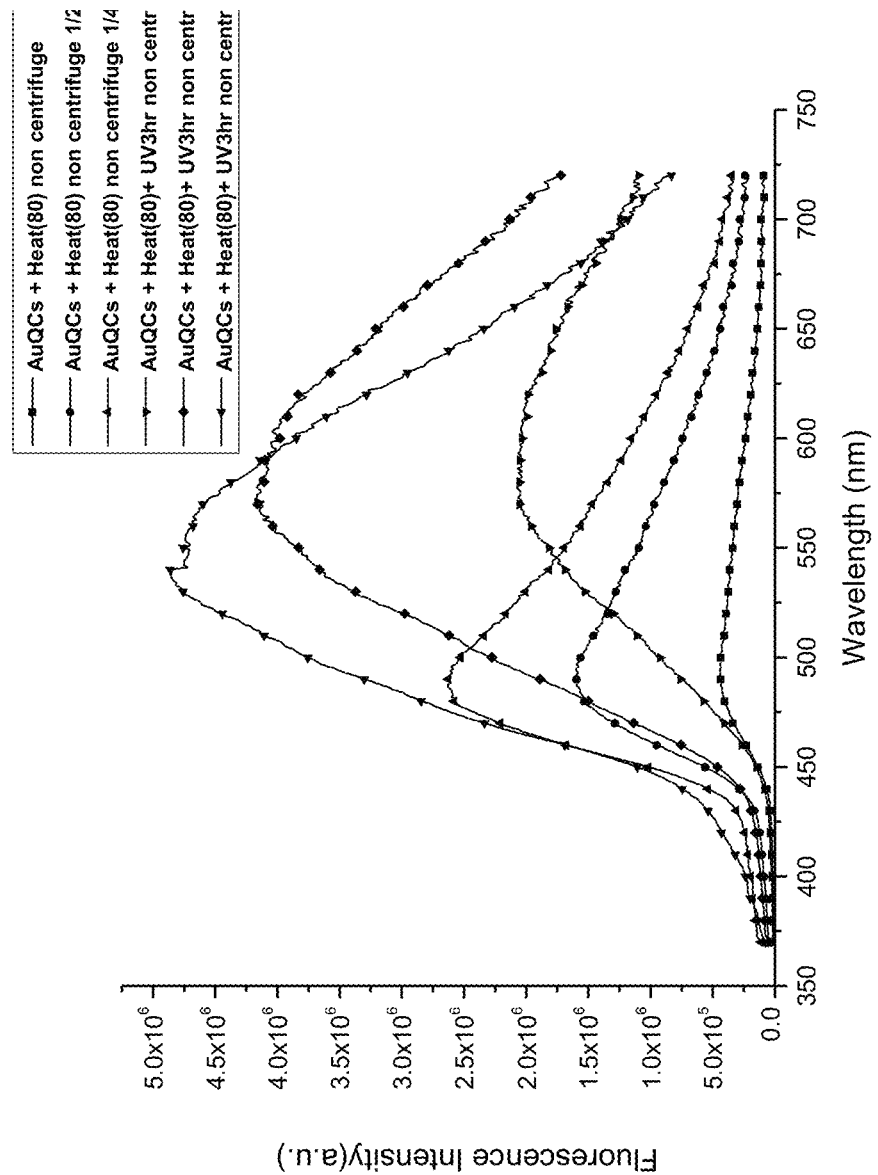
FIG. 6A and FIG. 6B are representative fluorescence spectra of fluorescent gold nanoclusters according to one working example of the present disclosure.
Figure 6B:
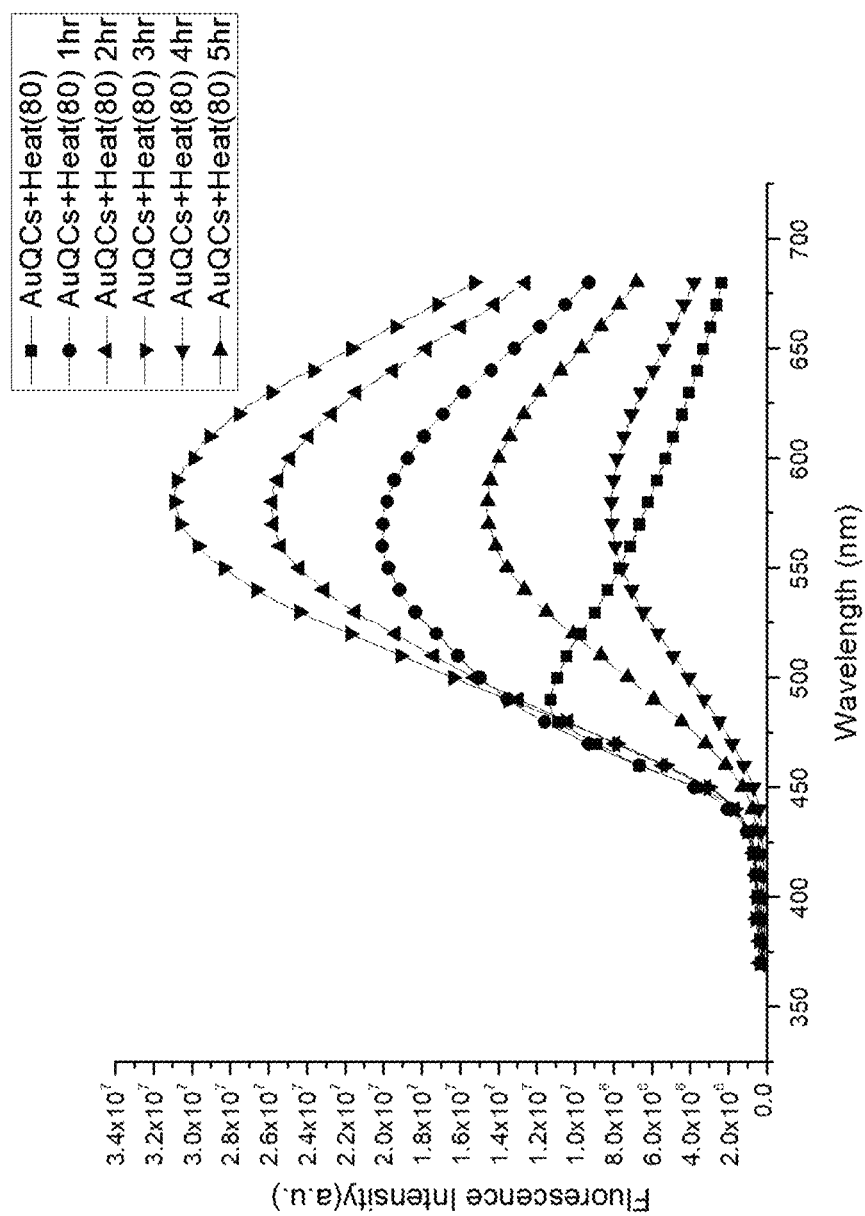

Similar to the finding in FIG. 5A, heat treatment at 80° C. turned the blue fluorescent gold nanoclusters into green fluorescent gold nanoclusters, with peak emission red shifted to about 500 nm (FIG. 6A). If the green fluorescent gold nanoclusters were diluted to ½, ¼, ⅛, 1/16/and 1/32 of the original concentration, the peak emission would slightly blue-shifted to about 480 nm, and the fluorescence intensity increased significantly (FIG. 6A, only data in ½ and ¼ dilutions is depicted). If the heat-treated gold nanoclusters were continued irradiated with UV light for 3 hours, the thus-produced fluorescent gold nanoclusters would emit yellow fluorescence instead of green fluorescence, with the peak emission appeared at 575 nm at excitation wavelength of 350 nm (FIG. 6A). It was further noted that UV induced red shift in the emission spectrum of the heat-treated fluorescent gold nanoclusters reached a plateau after being exposed to UV for 2 hours, the peak emission remained relatively the same at 575 nm even with continued UV exposure for up to 5 hours (FIG. 6B).

Figure 7A:
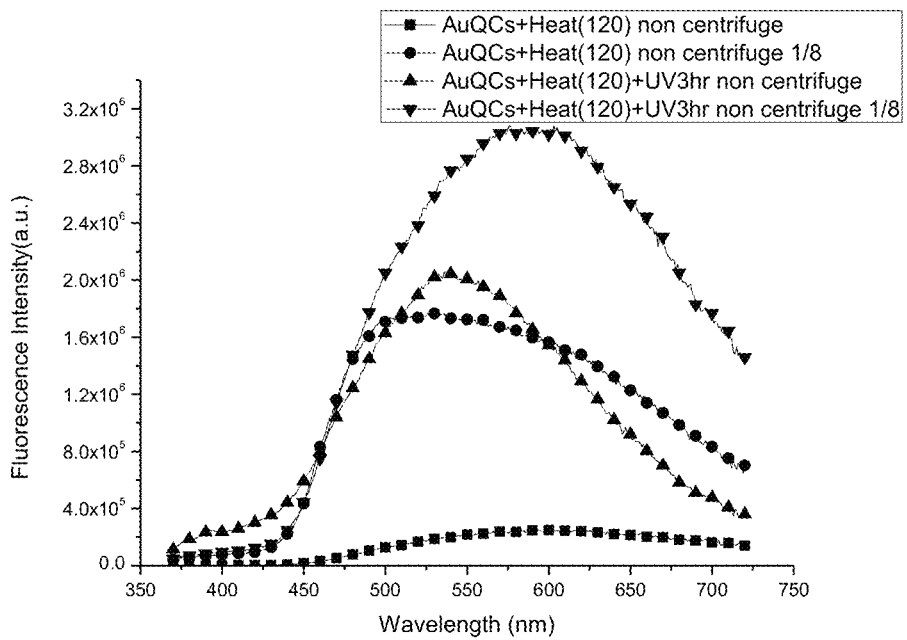
FIG. 7A and FIG. 7B are representative photographs and fluorescence spectra of fluorescent gold nanoclusters according to one working example of the present disclosure.
Figure 7B:
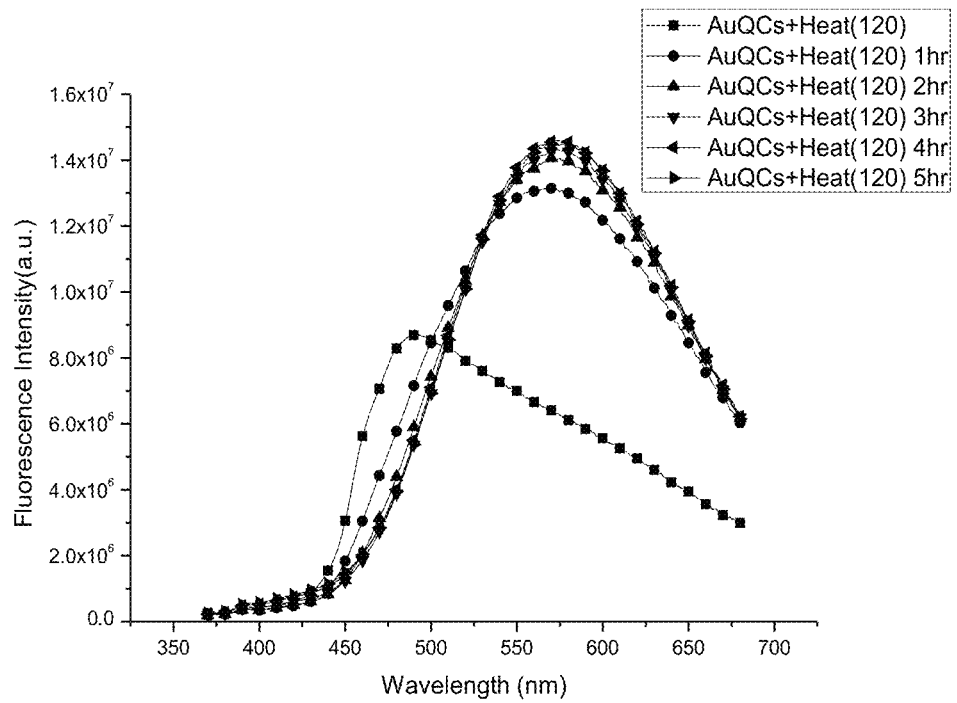

FIGS. 7A and 7B are results from subjecting the fluorescent gold nanoclusters to the combination of heating at 120° C. for 1 hour and UV exposure for up to 5 hours. It was found that heating at higher temperature (i.e., 120° C., instead of 80° C.) would move the peak emission shifted toward red end of the spectrum (i.e., 570 nm). If the heat-treated gold nanoclusters were further exposed to UV light for 2 hours, the peak emission moved further down to red end to 575 nm (FIG. 7A) and remained unchanged even if they were continued exposed to UV for a longer period, such as up to 5 hours (FIG. 7B).

Taken together, the data in the present example confirmed that the fluorescent characteristics (such as, emission peak and fluorescence intensity) of the gold nanoclusters may be modulated by the treatment of heat or UV, or both.

Example 3

Preparation and Modulation of Fluorescent Characteristics of Composite Fluorescent Gold Nanoclusters In this example, various surfactants were used as the capping agent to investigate whether the surfactants affect the fluorescent characteristics of the composite fluorescent gold nanoclusters.

3.1 Preparation and Modulation of Fluorescent Characteristics of Composite Fluorescent Gold Nanoclusters Containing Trioctyl Phosphine (TOP)

Briefly, the blue fluorescent gold nanoclusters of Example 1.1 was mixed with a toluene solution containing 200 mM TOP in a volume ratio of 9:1, so as to produce. TOP/toluene-capped fluorescent gold nanoclusters. The TOP/toluene-capped fluorescent gold nanoclusters were then irradiated with the UV lamp (365 nm) for up to 2 hours, and the fluorescence spectrum of the TOP/toluene-capped fluorescent gold nanoclusters was measured every 10 minutes.

Figure 8A:
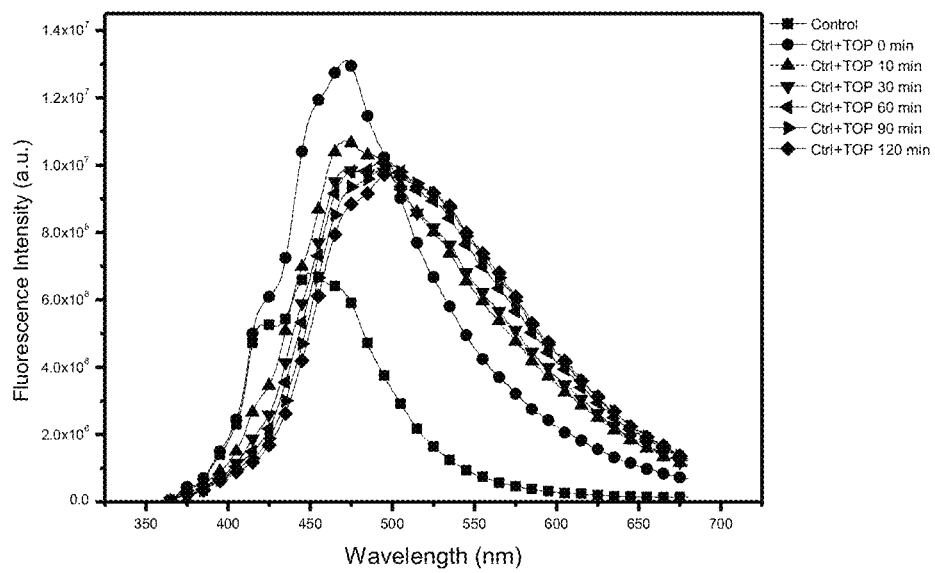
FIG. 8A and FIG. 8B are fluorescence spectra of fluorescent gold nanoclusters according to one working example of the present disclosure.

Reference is made to FIG. 8A, which indicates that before the UV treatment (0 minute), the peak emission of TOP/toluene-capped fluorescent gold nanoclusters red-shifted from about 450 nm to about 470 nm with the full width at half maximum (FWHM) being 0.55 eV, and the fluorescence intensity increased significantly. With the increase of the duration of the UV treatment, the peak emission of the composite fluorescent gold nanoclusters gradually red-shifted to 500 nm, and the final FWHM was 0.64 eV. As a whole, the results summarized in FIG. 8A indicated that the modification with TOP increased the fluorescence intensity of the composite fluorescent gold nanoclusters; also, the emission spectrum of TOP-modified fluorescent nanoclusters could be adjusted using the UV treatment.

Alternatively, the composite fluorescent gold nanoclusters comprising TOP were prepared by adding gold(III) chloride (1 mg/mL) into a toluene solution containing 200 mM TOP. As expected, the peak emission of the thus-produced TOP/toluene-capped fluorescent gold nanoclusters appeared at about 470 nm with the FWHM being about 0.45 eV. Moreover, after being subjected to UV irradiation, the peak emission of the composite fluorescent gold nanoclusters moved further toward red end to 500 nm with the FWHM being about 0.66 eV, and the fluorescence intensity also increased significantly (see FIG. 8B).

Taken together, the data in this example confirmed that TOP may not only result in red-shifting of the peak emission wavelength of the fluorescent gold nanoclusters, but also enhancing the fluorescent intensity. Also, the incorporation of TOP would not adversely affect the tunability of the fluorescent gold nanoclusters by UV treatment.

3.2 Preparation and Modulation of Fluorescent Characteristics of Composite Fluorescent Gold Nanoclusters Containing Trioctyl Phosphine Oxide (TOPO)

In this example, TOPO was used instead of TOP in preparing fluorescent gold nanoclusters in the similar manner as described in Example 3.1. Results are provided in FIG. 9.

Figure 9:
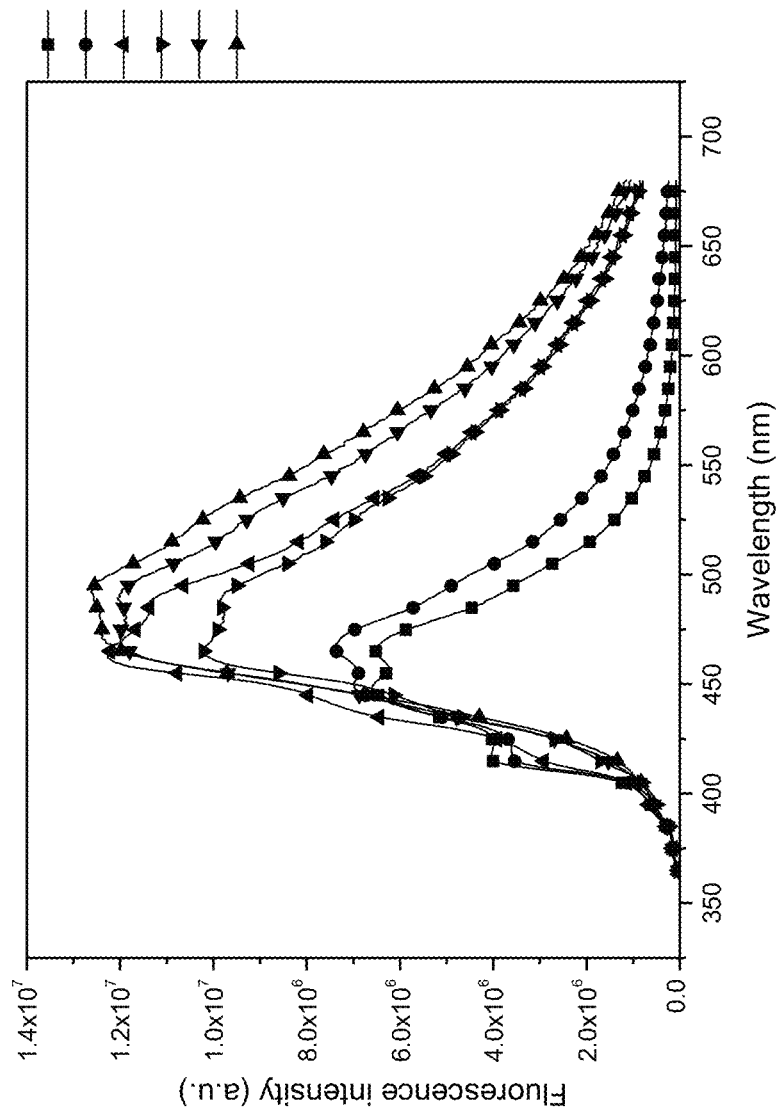
FIG. 9 are fluorescence spectra of fluorescent gold nanoclusters according to one working example of the present disclosure.

Similar to the findings in Example 3.1, addition of TOPO resulted in red-shift in the emission spectrum of the fluorescent gold nanoclusters as well, in which peak emission of the fluorescent gold nanoclusters moved from 450 nm to 470 nm, with the FWHM being about 0.49 eV (FIG. 9). When the fluorescent gold nanoclusters were further irradiated with UV for 2 hours, the peak emission would move further down toward the red end to about 500 nm, and the FWHM went up to about 0.64 eV. Moreover, the fluorescence intensity of the thus-produced composite fluorescent gold nanoclusters also increased after the UV treatment (FIG. 9).

Figure 8B:
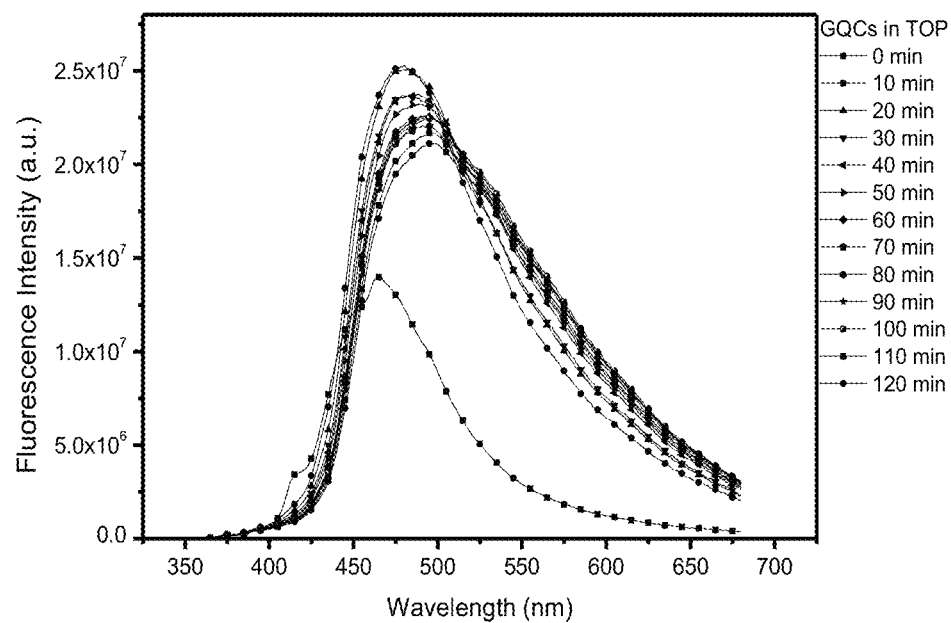

Also similar to the findings in FIG. 8B, if the composite gold nanoclusters comprising TOPO were prepared by directly adding gold(III) chloride (1 mg/mL) into the toluene solution containing 200 mM TOPO; then, the peak emission of the thus-produced gold nanoclusters appeared at about 470 nm with the FWHM being about 0.43 eV; and the emission peak moved to 550 nm with the FWHM being about 0.66 eV after being treated with UV light for 2 hours (data not shown). Furthermore, the fluorescence intensity of the thus-produced composite fluorescent gold nanoclusters also increased after the UV treatment (data not shown).

Taken together, results in this example confirmed that TOPO, like TOP, is also effective in red-shifting the peak emission of the fluorescent gold nanoclusters and enhancing their fluorescent intensities. Also, the incorporation of TOPO would not adversely affect the tunability of the fluorescent gold nanoclusters by UV treatment.

3.3 Preparation and Modulation of Fluorescent Characteristics of Fluorescent Gold Nanoclusters Containing 1,2-Dioleoyl-3-Trimethylammonium-Propane (DOTAP)

In this example, DOTAP was used instead of TOP in preparing fluorescent gold nanoclusters in similar manner as described in Example 3.1. Note that DOTAP differs from TOP of Example 3.1 or TOPO of Example 3.2 in that it does not contain the phosphine group in the molecule. Results are provided in FIG. 10.

Figure 10:
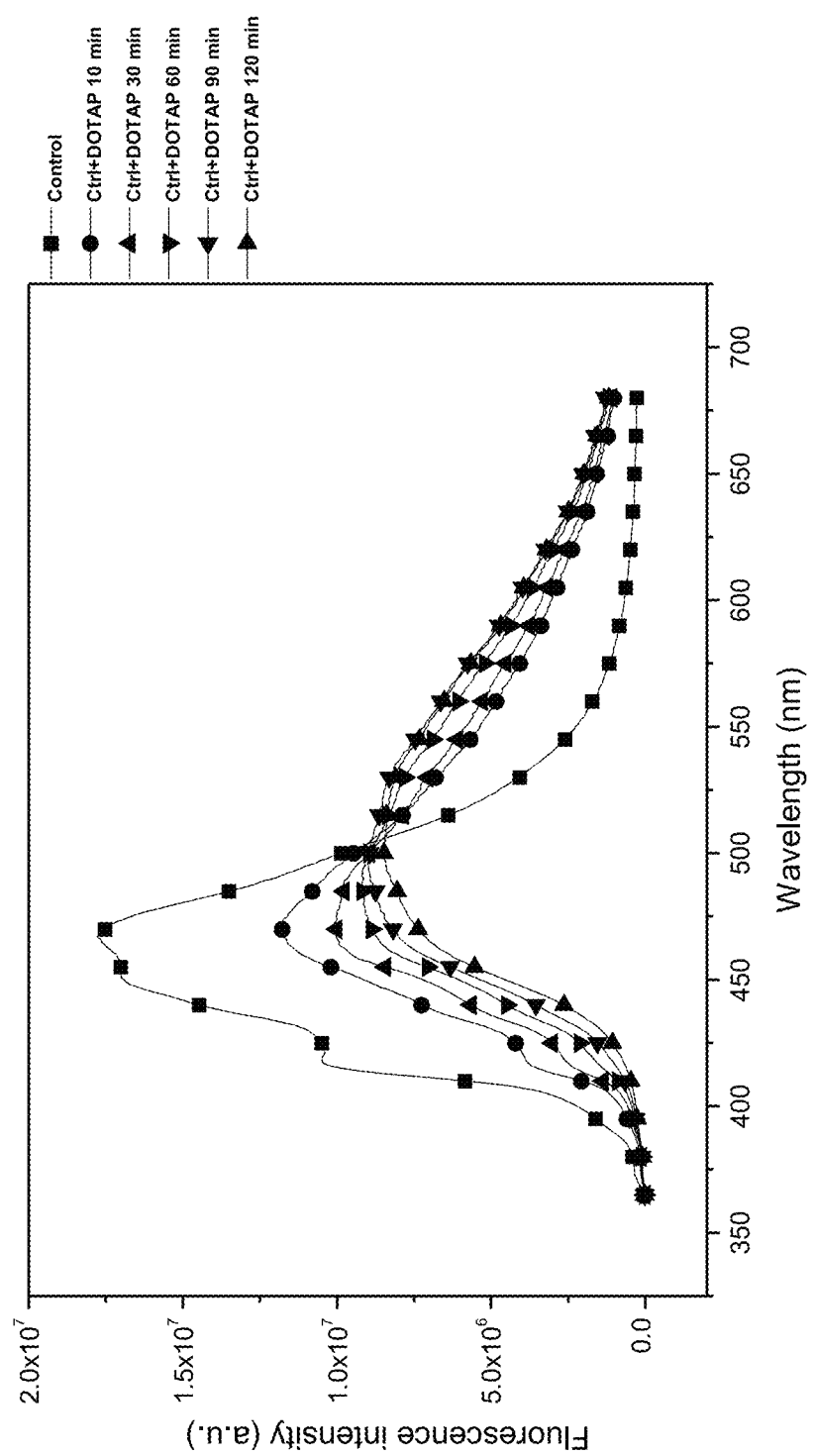
FIG. 10 are fluorescence spectra of fluorescent gold nanoclusters according to one working example of the present disclosure.

The addition of DOTAP resulted in the red-shifting of the peak emission of the blue fluorescent gold nanoclusters from 450 nm to 470 nm, with the FWHM being about 0.52 eV; however, the fluorescence intensity increased significantly, as compared to that of the DOTAP-free fluorescent gold nanoclusters (FIG. 10). If the DOTAP-containing fluorescent gold nanoclusters were further irradiated with UV for 2 hours, the peak emission moved slightly down to about 480 nm, which was still in the range of the blue light. Also, the FWHM went up to about 0.71 eV. Moreover, for DOTAP-containing fluorescent gold nanoclusters, the fluorescence intensity thereof was not increased by UV irradiation for up to 2 hours (FIG. 10).

Alternatively, the fluorescent gold nanoclusters comprising DOTAP were prepared by directly adding gold (III)

chloride (1 mg/mL) into the toluene solution containing 200 mM DOTAP; and similar to the findings from FIG. 10, the peak emission appeared at about 470 nm with the FWHM being about 0.4 eV; and the peak emission slightly move to 480 nm with the FWHM being about 0.7 eV after the fluorescent gold nanoclusters were further treated with UV light for 2 hours (data not shown).

Taken together, the data in this example indicated that including a non-phosphine containing surfactant such as DOTAP jeopardized the tunability of the fluorescent characteristics of the fluorescent gold nanoclusters. In particular, the composite fluorescent gold nanoclusters from Examples 3.1 and 3.2 exhibited desirable tunability in that both the peak emission and fluorescence intensity are modulated significantly by external energy. On the other hand, the peak emission of the DOTAP-containing fluorescent gold nanoclusters could not reach above 500 nm after the 2-hour UV irradiation. Also, in some cases, the UV treatment failed to substantially increase the fluorescence intensity of the DOTAP-containing fluorescent gold nanoclusters.

Example 4

Modulating Fluorescent Characteristics of Composite Fluorescent Gold Nanoclusters by Heat and/or UV In this example, fluorescent gold nanoclusters were prepared in accordance with the steps described in Example 2, then TOP was further added to produce composite fluorescent gold nanoclusters capped with TOP.

Briefly, fluorescent gold nanoclusters of Example 2.1 (UV-treated) or 2.2 (heat-treated) were mixed with a toluene solution containing 200 mM TOP in a volume ratio of 9:1 to produce fluorescent gold nanoclusters capped with TOP. The thus-produced fluorescent gold nanoclusters were then treated with UV irradiation for additional 24 hours.

Figure 11:
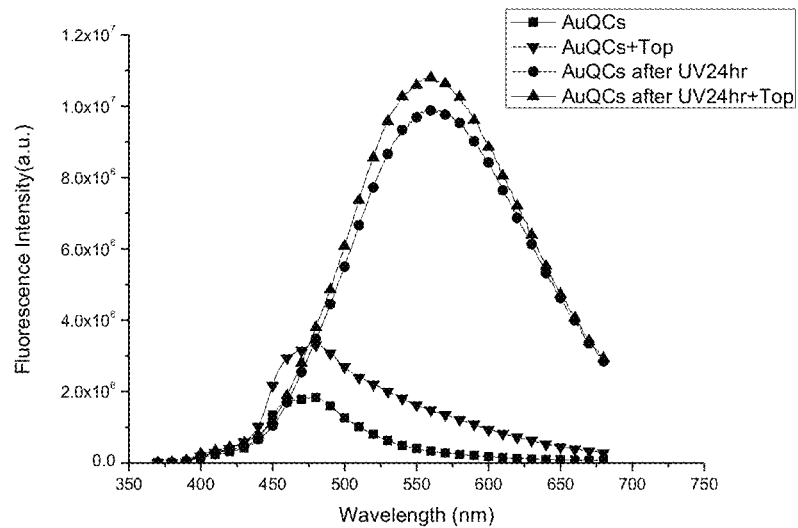
FIG. 11 depicts the fluorescence spectrum of fluorescent gold nanoclusters according to one working example of the present disclosure.

It was found that the peak emission of the TPO-containing fluorescent gold nanoclusters remained relatively unchanged as compared with that of the control (i.e., the TPO-free fluorescent gold nanoclusters of Example 2.1); on the other hand, the fluorescence intensity of the TPO-containing fluorescent gold nanoclusters increased as compared with that of the control (FIG. 11). After the UV treatment, fluorescence intensity of the thus-produced composite fluorescent gold nanoclusters increased significantly, and the peak emission red-shifted to around 555 nm (FIG. 11).

In some cases, the composite fluorescent gold nanoclusters were further treated with TOP. The results indicated that the further addition of TOP to the TOP-containing fluorescent gold nanoclusters further improved the fluorescence intensity, while the peak emission remained substantially the same (FIG. 11).

Figure 12:
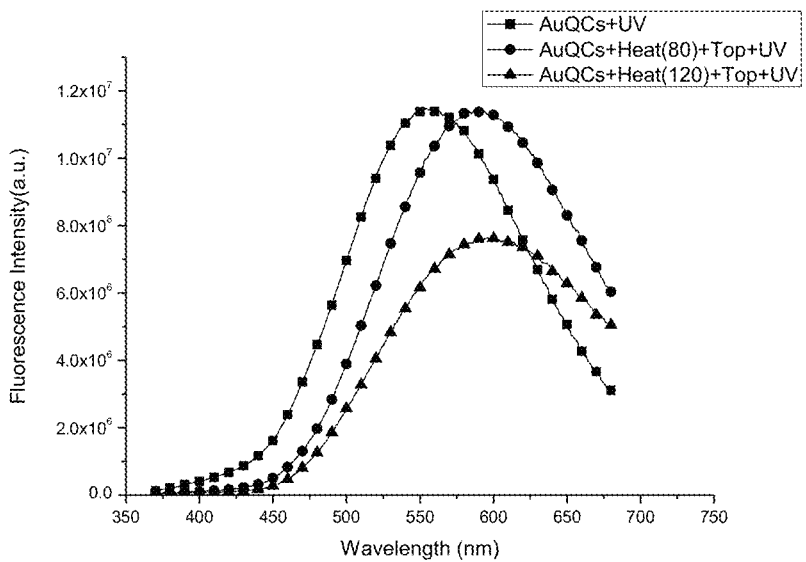
FIG. 12 depicts the fluorescence spectrum of fluorescent gold nanoclusters according to one working example of the present disclosure.

As to heat-treated (80° C.) fluorescent gold nanoclusters from example 2.2, the diluted nanoclusters were capped with TOP and then irradiated with UV for 24 hours. According to FIG. 12, the addition of TOP would not affect the tunability of the peak emission of the heat-treated fluorescent gold nanoclusters by UV treatment. On the other hand, the fluorescence intensity of the thus-produced composite fluorescent gold nanoclusters was greatly enhanced by the addition of TOP (FIG. 12).

In conclusion, experimental results from Example 1 to Example 4 demonstrated that when the fluorescent gold nanoclusters were capped with a benzene-containing compound (e.g., toluene), the peak emission and fluorescence intensity of the fluorescent gold nanoclusters may be modulated by applying an external energy from, for example, UV irradiation, heat, or the combination of both. In this way, the emission peak of the fluorescent gold nanoclusters red-shifts from the blue wavelength to the green or yellow wavelength (generally, in the range of about 500 to 580 nm, such as 575 nm), and the fluorescence intensity thereof increases significantly. On the other hand, for fluorescent gold nanoclusters with emission peak in the range of or close to the blue wavelength, capping the fluorescent gold nanoclusters with a phosphine-based surfactant also facilitates the red-shifting of the emission peak to the green or yellow wavelength; however, for fluorescent gold nanoclusters with emission peak in the relatively stable green or yellow wavelength, no further red-shifting is caused by the capping of the phosphine-based surfactant. Moreover, the capping of the phosphine-based surfactant also increases the fluorescence intensity of fluorescent gold nanoclusters to a greater extent. As could be appreciated, gold nanoclusters have an emission peak in the blue wavelength, and as is evident from the experimental data provided herein, by capping the gold nanoclusters with the benzene-containing compound and the phosphine containing compound, the resultant composite fluorescent gold nanoclusters may emit green or yellow fluorescence, and the fluorescence intensity thereof increases greatly. In view of the foregoing, the proposed composite fluorescent gold nanoclusters have a better (or higher) quantum yield (i.e., luminous efficacy).

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A method of producing composite fluorescent gold nanoclusters, comprising,
    (a) mixing gold(III) chloride ($AuCl_3$) and a benzene-based compound in a molar ratio of 1:0.5 to 1:5 to produce a first fluorescent gold nanoclusters; and
    (b) treating the first fluorescent gold nanoclusters with an energy source selected from the group consisting of UV, acoustic, heat, microwave and a combination thereof to produce a second fluorescent gold nanoclusters; and
    (c) modifying the second fluorescent gold nanoclusters of the step (b) with a phosphine-based compound to produce the composite fluorescent gold nanoclusters;
    wherein,
    wherein, the method is characterized in not using any reducing agent;
    the first and second fluorescent gold nanoclusters respectively emit blue and yellow light; and
    the composite fluorescent gold nanoclusters independently emit yellow or green light with the peak emission wavelength ranges from 500 nm to 580 nm.

2. The method of claim 1, wherein the benzene-based compound is selected from the group consisting of, benzene, alkylbenzene, halobenzene, phenol, benzoic acid, acetophenone, methyl benzoate, anisole, aniline, nitrobenzene, benzonitrile, benzamide, benzenesulfonic acid, naphthalene, and anthracene.

3. The method of claim 2, wherein the benzene-based compound is toluene.

4. The method of claim 1, wherein the phosphine-based compound is selected from the group consisting of, phosphine, phosphine oxide, phosphonium, diphosphine, triphosphine, alkyl phosphine, cycloalkyl phosphine, aryl phosphine, aryl phosphine oxide, bidentate phosphine, silicone derivative of phosphine, siloxane or polysilane derivative of phosphine, and olefinic phosphine.

5. The method of claim 4, wherein the alkyl phosphine is trioctylphosphine (TOP), and the aryl phosphine oxide is trioctylphosphine oxide (TOPO).

6. A method of producing composite fluorescent gold nanoclusters, comprising, (a) mixing gold(III) chloride ($AuCl_3$), a benzene-based compound, and a phosphine-based compound in a molar ratio of 1:0.5:0.1 to 1:5:20 to produce fluorescent gold nanoclusters; and (b) treating the fluorescent gold nanoclusters with an energy source selected form the group consisting of UV, acoustic wave, heat, microwave and a combination thereof to produce the composite fluorescent gold nanoclusters; wherein, the method is characterized in not using any reducing agent; and the composite fluorescent gold nanoclusters independently emit yellow or green light with the peak emission wavelength ranges from 500 nm to 580 nm.

7. The method according to claim 6, wherein the benzene-based compound is selected from the group consisting of, benzene, alkylbenzene, halobenzene, phenol, benzoic acid, acetophenone, methyl benzoate, anisole, aniline, nitrobenzene, benzonitrile, benzamide, benzenesulfonic acid, naphthalene, and anthracene.

8. The method of claim 7, wherein the benzene-based compound is toluene.

9. The method of claim 6, wherein the phosphine-based compound is selected from the group consisting of, phosphine, phosphine oxide, phosphonium, diphosphine, triphosphine, alkyl phosphine, cycloalkyl phosphine, aryl phosphine, aryl phosphine oxide, bidentate phosphine, silicone derivative of phosphine, siloxane or polysilane derivative of phosphine, and olefinic phosphine.

10. The method of claim 9, wherein the alkyl phosphine is trioctylphosphine (TOP), and the aryl phosphine oxide is trioctylphosphine oxide (TOPO).

* * * * *